United States Patent
Fujisawa et al.

(10) Patent No.: US 10,521,044 B2
(45) Date of Patent: Dec. 31, 2019

(54) DISPLAY DEVICE HAVING AN AUXILIARY WIRING

(71) Applicant: Japan Display Inc., Tokyo (JP)

(72) Inventors: Akihiko Fujisawa, Tokyo (JP); Daisuke Ito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/895,135

(22) Filed: Feb. 13, 2018

(65) Prior Publication Data

US 2018/0267665 A1  Sep. 20, 2018

(30) Foreign Application Priority Data

Mar. 14, 2017 (JP) .................................. 2017-048221

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04101* (2013.01); *G06F 2203/04112* (2013.01)

(58) Field of Classification Search
CPC ............................... G06F 3/044; G06F 3/0416
USPC ....................................... 345/174; 178/18.06
See application file for complete search history.

(56) References Cited

U.S. PATENT DOCUMENTS

| | | | |
|---|---|---|---|
| 2014/0070875 A1* | 3/2014 | Dunphy .................. | G06F 3/044 327/517 |
| 2014/0146008 A1* | 5/2014 | Miyahara ................ | G06F 3/044 345/174 |
| 2014/0253501 A1* | 9/2014 | Noguchi ................. | G06F 3/044 345/174 |
| 2015/0220204 A1* | 8/2015 | Noguchi ................. | G06F 3/044 345/174 |

FOREIGN PATENT DOCUMENTS

JP     2015-011582 A     1/2015

* cited by examiner

*Primary Examiner* — Adam J Snyder
(74) *Attorney, Agent, or Firm* — K&L Gates LLP

(57) ABSTRACT

The display device includes a detection circuit, a touch detection region including a plurality of detection electrodes, a peripheral region around the touch detection region, a plurality of wirings passing the peripheral region from the detection electrodes so as to be connected to the detection circuit, and at least one auxiliary wiring extending parallel to the wirings so as to be connected to the detection circuit.

12 Claims, 26 Drawing Sheets

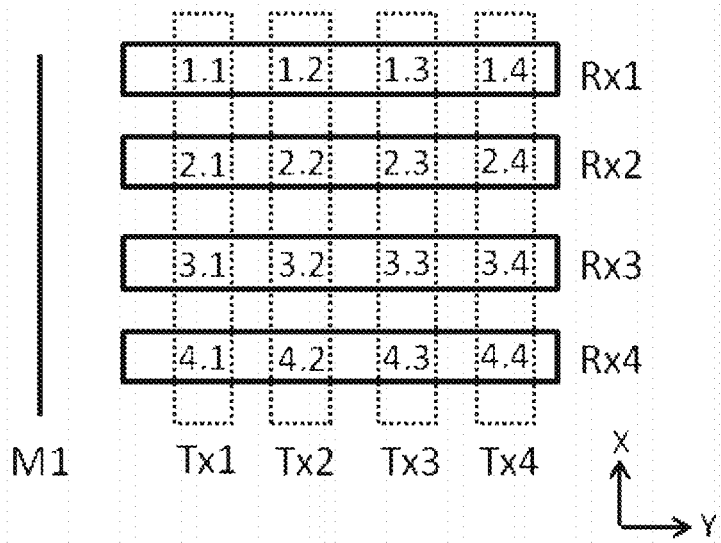

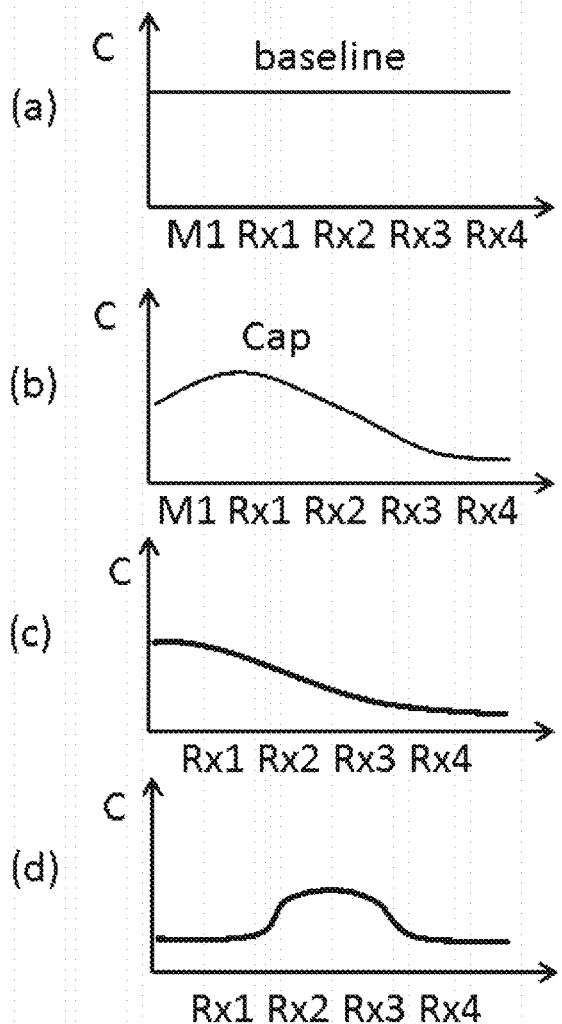

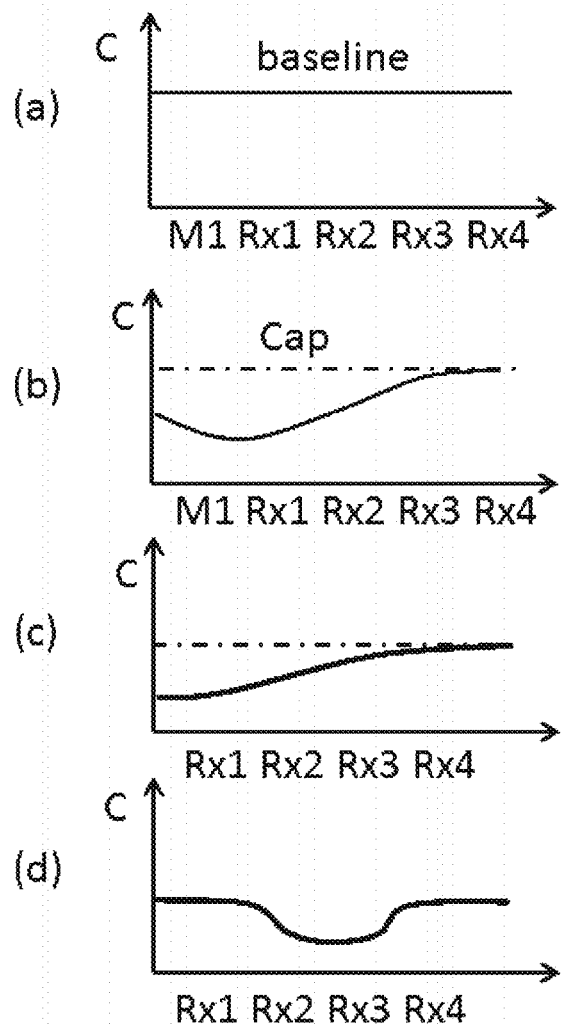

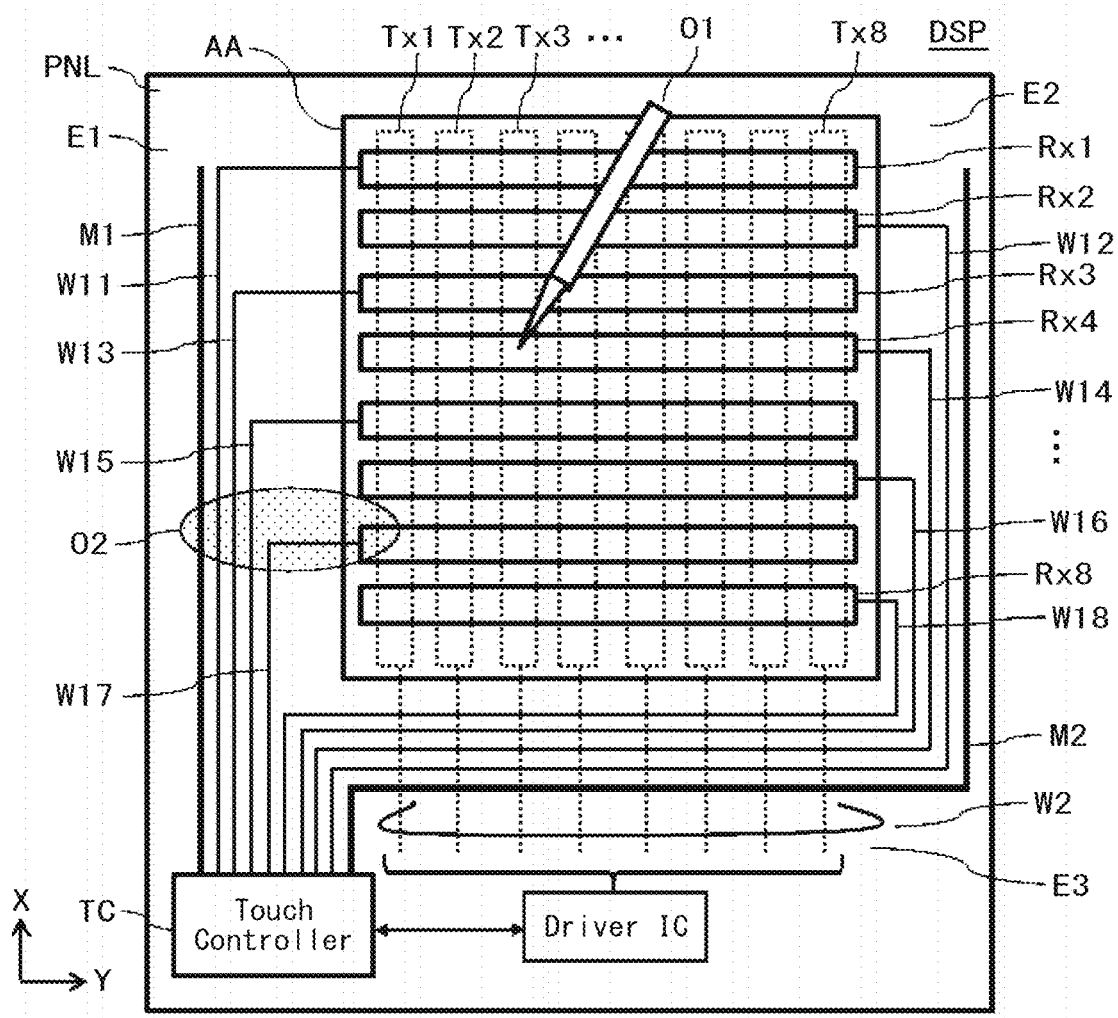

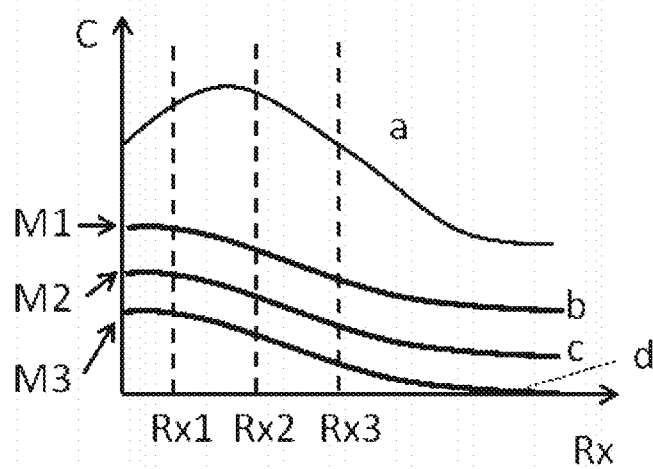

under United States Patent and Trademark Office notation US 10,521,044 B2

DISPLAY DEVICE HAVING AN AUXILIARY WIRING

CLAIM OF PRIORITY

The present application claims priority from Japanese Patent Application JP 2017-048221 filed on Mar. 14, 2017, the content of which is hereby incorporated by reference into this application.

BACKGROUND

The disclosure relates to a display device which can be applied to a display device with touch sensor.

SUMMARY

A display device comprising: a detection circuit; a touch detection region including a plurality of detection electrodes; a peripheral region around the touch detection region; a plurality of wirings passing the peripheral region from the detection electrodes so as to be connected to the detection circuit; at least one auxiliary wiring extending parallel to the wirings so as to be connected to the detection circuit.

BRIEF DESCRIPTION OF THE DRAWINGS

FIG. 10 schematically shows an arrangement of common electrodes, detection electrodes, and an auxiliary wiring;

FIG. 11 schematically shows Baseline capacitance values corresponding to the arrangement as shown in FIG. 10;

FIG. 12 schematically shows capacitance values upon scanning of the common electrodes as shown in FIG. 10;

FIG. 13 schematically shows coefficients α corresponding to the arrangement as shown in FIG. 10;

FIG. 14A is an explanatory diagram conceptually expressing change (Delta) of the respective capacitance values;

FIG. 14B is an explanatory diagram conceptually expressing the respective capacitance values as those of actual capacitance;

FIG. 17 is a plan view showing another exemplary structure of the sensor provided for the display device DSP with sensor according to the embodiment;

FIG. 21B is a conceptual explanatory diagram of detection values through the auxiliary wirings of the display device DSP with sensor as shown in FIG. 20;

DETAILED DESCRIPTION

Figure 1:
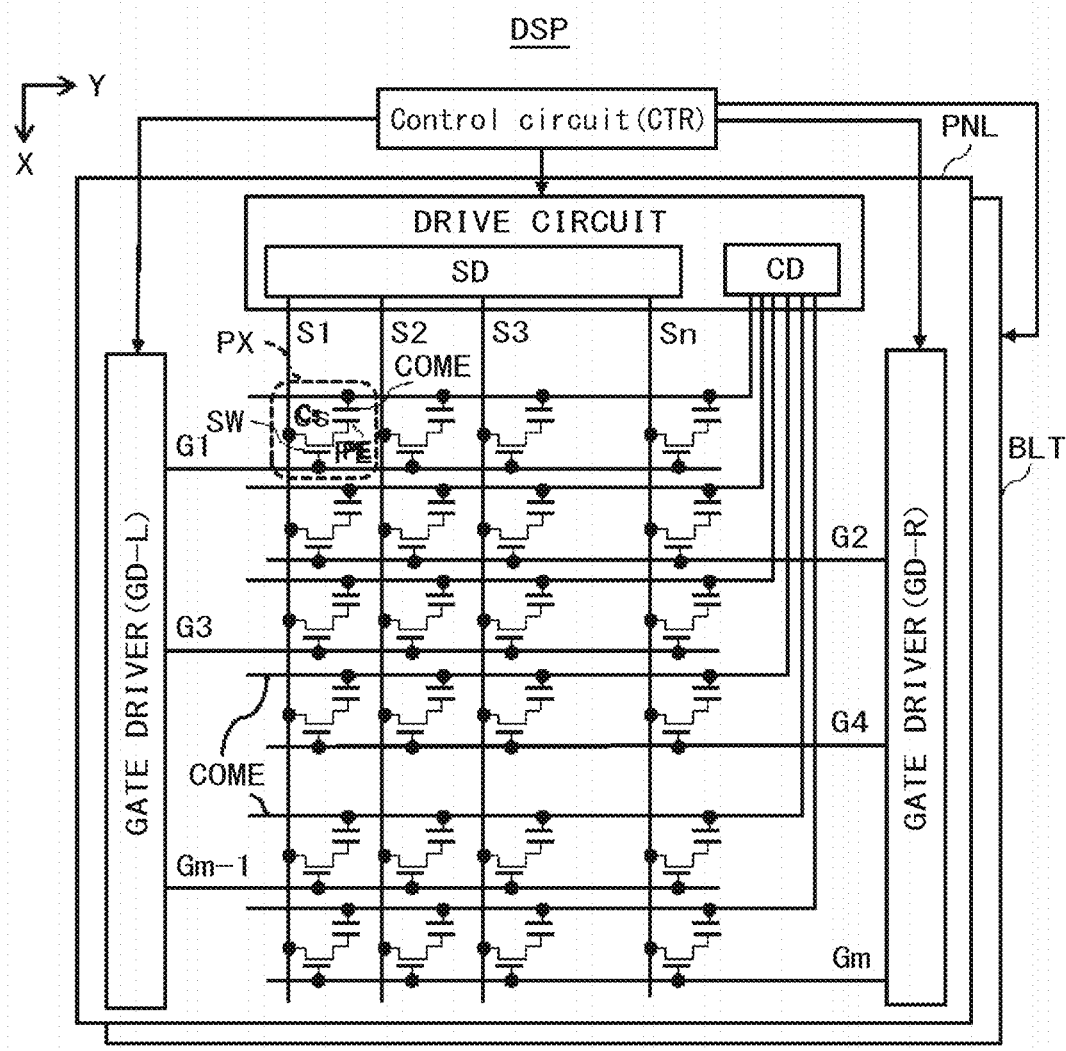
FIG. 1 illustrates a structure of the display device DSP with sensor according to an embodiment.

Embodiments of the present invention will be described referring to the drawings.

The description is disclosed only for illustrative purpose, and any change or modification is possible in light of the above teachings so long as it is within the scope of the present invention as understood by the person skilled in the art. Each of the drawings is also referred for illustrative purpose, and may be schematically expressed with respect to width, thickness, shape and the like of the respective parts with no intention to limit the interpretation of the present invention. The element as previously described herein, or shown in the drawings will be designated with the same code, and detailed explanation thereof will be omitted.

The touch sensor is configured to supply the detection electrode (Rx) disposed on the input region (active area AA) of the touch sensor to a touch controller via the lead-out wiring on a frame region on the periphery of the input region. In the above-described configuration, there may cause the risk that an object around the wiring part of the lead-out wiring on the frame region is falsely recognized as being around the input region of the touch sensor.

In the presence of a relatively large object spanning from the input region of the touch sensor to the wiring part of the lead-out wiring, the charge from a drive electrode (Tx) intersecting the detection electrode (Rx) in the input region may flow into the lead-out wiring of the frame region, causing the risk of lowering the strength of the detection signal.

The display device according to an embodiment of the present invention includes a detection circuit, a touch detection region including a plurality of detection electrodes, a peripheral region around the touch detection region, a plurality of wirings passing the peripheral region from the detection electrodes so as to be connected to the detection circuit, and at least one auxiliary wiring extending parallel to the wirings so as to be connected to the detection circuit.

The display device according to another embodiment of the present invention includes a display panel including a plurality of display elements, a plurality of detection electrodes each with a capacitance for detecting an external proximity object around a detection region, a plurality of wirings laid out along at least one side of the display panel, the wirings being connected to the detection electrodes, respectively, an auxiliary wiring disposed parallel to the wirings, and a control circuit electrically coupled to the wirings and the auxiliary wiring for detecting each capacitance of the detection electrodes and the auxiliary wiring.

FIG. 1 is a view schematically showing a structure of the display device DSP with sensor according to an embodiment. In this embodiment, the explanation will be made with respect to the display device, taking the liquid crystal display device as an example.

The display device DSP with sensor includes a display panel PNL, and a backlight BLT for illuminating the display panel PNL from the backside. The display panel PNL has a display section including display pixels PX arrayed in a matrix.

Referring to FIG. 1, arranged on the display section are gate lines G (G1, G2, . . . ) extending along rows of a plurality of display pixels PX, source lines S (S1, S2, . . . ) extending along columns of the display pixels PX, and pixel switches SW each located near the position where the gate line (scanning line) G and the source line (signal line) S intersect. Each of the display pixels PX includes a pixel electrode PE and a common electrode COME, having a liquid crystal layer between the pixel electrode PE and the common electrode COME which are facing with each other. The common electrodes COME extending in the row direction (Y) are arranged in the column direction (X). The common electrodes COME extending in the column direction (X) may be arranged in the row direction (Y).

The pixel switch SW includes a thin film transistor (TFT). The gate electrode of the pixel switch SW is electrically coupled to the corresponding gate line G. The source electrode of the pixel switch SW is electrically coupled to the corresponding source line S. The drain electrode of the pixel switch SW is electrically coupled to the corresponding pixel electrode PE.

Gate drivers GD (GD-L at the left side and GD-R at the right side), a source driver SD, and a common electrode drive circuit CD are provided for driving the display pixels PX. The gate lines G are electrically coupled to output sections of the respective gate drivers GD. The source lines S are electrically coupled to an output section of the source driver SD. The common electrodes COME are electrically coupled to an output section of the common electrode drive circuit CD. As FIG. 1 shows, the source driver SD and the common electrode drive circuit CD are disposed inside the drive circuit.

The gate drivers GD, the source driver SD, and the common electrode drive circuit CD are disposed on a flexible substrate connected to a peripheral region (frame region) around the display section, or the display panel PNL. The gate driver GD applies ON voltage to the gate lines G sequentially so as to supply the ON voltage to the gate electrode of the pixel switch SW electrically coupled to the selected gate line G. Then conduction is established between the source electrode and the drain electrode of the pixel switch SW having the ON voltage applied to the gate electrode. The source driver SD supplies corresponding output signals to the source lines S. The signal supplied to the source line S is supplied to the corresponding pixel electrode PE via the pixel switch SW at which the conduction is established between the source electrode and the drain electrode.

The respective operations of the gate drivers GD, the source driver SD, and the common electrode drive circuit CD are controlled by a control circuit CTR disposed outside or inside the display panel PNL. The control circuit CTR further controls the operation of the backlight BLT.

Figure 2:
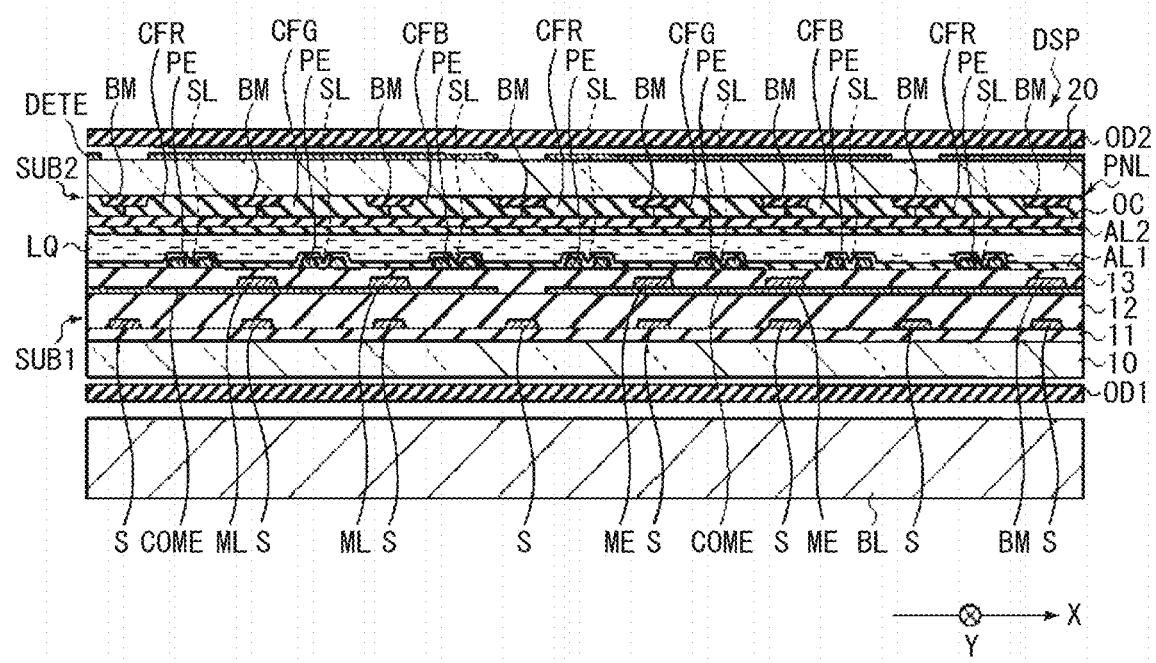
FIG. 2 is a sectional view of the structure of the display device DSP with sensor according to the embodiment.

FIG. 2 is a sectional view of the structure of the display device DSP with sensor according to the embodiment.

The display DSP device with sensor includes the in-cell type touch sensor, the display panel PNL, the backlight BLT, a first optical element OD1, and a second optical element OD2. The illustrated example employs the liquid crystal display panel as the display panel PNL. However, it is possible to employ other type of flat panel, for example, the organic electroluminescent display panel as the display panel PNL. The illustrated display panel PNL is configured to be adaptable to the horizontal field mode as the display mode. However, it may be configured to be adaptable to any other display mode.

The display panel PNL includes a first substrate SUB1, a second substrate SUB2, and a liquid crystal layer LQ. The first substrate SUB1 and the second substrate SUB2 are laminated having a predetermined cell gap therebetween. The liquid crystal layer LQ is held in the cell gap between the first substrate SUB1 and the second substrate SUB2.

The first substrate SUB1 is made of a first insulating substrate 10 with optical permeability such as the glass substrate and the resin substrate. The first substrate SUB1 includes the source lines S, the common electrodes COME, the pixel electrodes PE, a first insulating film 11, a second insulating film 12, a third insulating film 13, and a first alignment film AL1 at the side of the first insulating substrate 10 facing the second substrate SUB2.

The pixel electrodes PE and the common electrodes COME constitute the display pixels together with the pixel region of the liquid crystal layer disposed between those electrodes. The display pixels are arranged in a matrix on the display panel PNL.

The first insulating film 11 is disposed on the first insulating substrate 10. Although not described in detail, the gate lines G, and the gate electrode and a semiconductor layer of the switching element are interposed between the first insulating substrate 10 and the first insulating film 11. The source lines S are disposed on the first insulating film 11. The source electrode and the drain electrode of the switching element are disposed on the first insulating film 11. As illustrated in the drawing, the source line S parallel to the common electrode COME extends toward the second direction Y.

The second insulating film 12 is disposed on the source line S and the first insulating film 11. The common electrode COME is provided on the second insulating film 12. In the illustrated example, the common electrode COME is made of a plurality of segments. The respective segments of the common electrode COME are arranged in the first direction X at intervals, while extending in the second direction Y. The above-described common electrode COME is made from the transparent conductive material, for example, indium tin oxide (ITO) and indium zinc oxide (IZO). In the illustrated example, a metal layer ML is provided on the common electrode COME for lowering its resistance. However, it is possible to omit the metal layer ML.

The third insulating film 13 is disposed on the common electrode COME, the metal layer ML, and the second insulating film 12. The pixel electrode PE is provided on the third insulating film 13. Each of the pixel electrodes PE is disposed between the adjacent source lines S while facing the common electrode COME. Each pixel electrode PE includes a slit SL at the position facing the common electrode COME. The above-described pixel electrode PE is made from the transparent conductive material, for example, ITO and IZO. The first alignment film AL1 covers the pixel electrode PE and the third insulating film 13.

Meanwhile, the second substrate SUB2 is formed by using the second insulating substrate 20 with optical permeability such as the glass substrate and the resin substrate. The second substrate SUB2 includes a black matrix BM, color filters CFR, CFG, CFB, an overcoat layer OC, and a second alignment film AL2 at the side of the insulating substrate 20, facing the first substrate SUB1.

The black matrix BM is provided on the inner surface of the second insulating substrate 20 while dividing the pixels. The color filters CFR, CFG, and CFB are provided on the inner surface of the second insulating substrate 20, which are partially overlapped with the black matrix BM. The CFR is a color filter for red. The CFG is a color filter for green. The CFB is a color filter for blue. The overcoat layer OC which covers the color filters CFR, CFG, and CFB is made of a transparent resin material. The second alignment film AL2 covers the overcoat layer OC.

The detection electrode DETE is provided on an outer surface of the second insulating substrate 20 while extending in the direction intersecting the respective segments of the common electrode COME. In the illustrated example, the detection electrode extending toward the first direction X is made from the transparent conductive material such as ITO and IZO.

The backlight BLT is disposed at the backside of the display panel PNL. The backlight BLT may be configured into various forms, for example, the one using a light emitting diode (LED) as the light source, or using the cold-cathode tube (CCFL).

The first optical element OD1 is disposed between the first insulating substrate 10 and the backlight BLT. The second optical element OD2 is disposed on the detection electrode DETE. Each of the first optical element OD1 and the second optical element OD2 contains at least a polarization plate. It is possible to add a phase retardation plate as needed.

Then the touch sensor used for the display device DSP with sensor will be described. As described above, the sensor may be operated in accordance with two different modes, that is, mutual detection mode and self detection mode for detecting the state where the external object such as the user's finger and the pen is brought into contact with or proximity to the touch panel.

<Mutual Detection Mode>

Figure 3A:
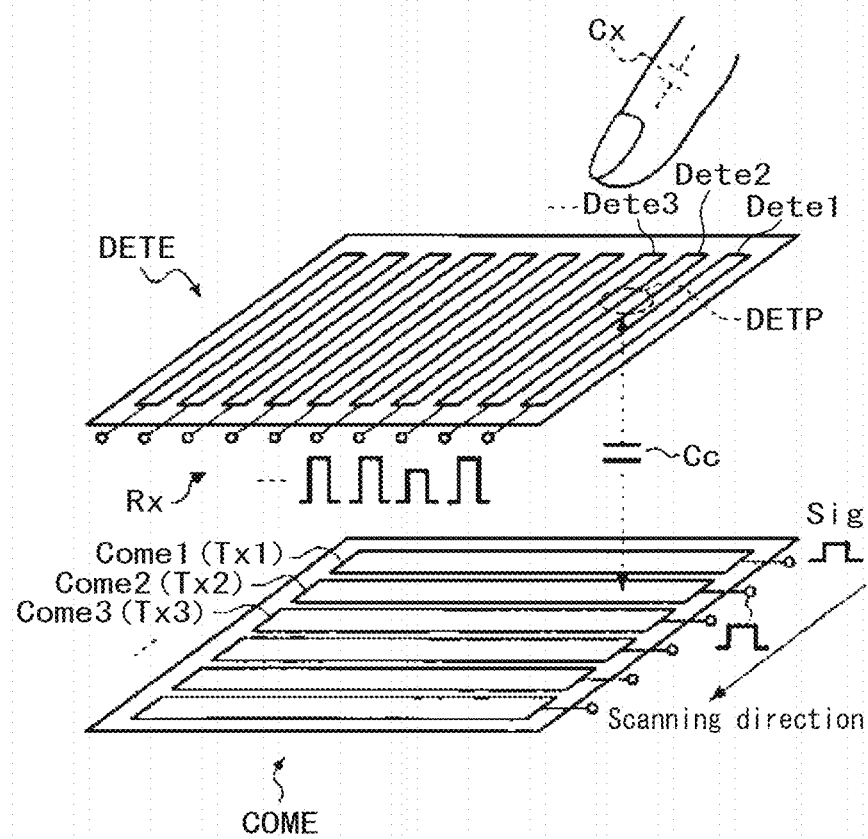
FIG. 3A illustrates a representative basic structure of the display device DSP with sensor in mutual detection mode according to the embodiment.

FIG. 3A shows the basic configuration as a representative example of the display device DSP with sensor to be operated in the mutual detection mode. The common electrodes COME (Tx) and the detection electrodes DETE (Rx) are used for constituting the sensor.

The common electrode COM (Tx) includes a plurality of common electrodes Come1, Come2, Come3, and the like in a stripe arrangement, for example. Those common electrodes Come1, Come2, Come3, and the like are arranged in the scanning (driving) direction (Y direction or X direction).

Meanwhile, the detection electrode DETE (Rx) includes a plurality of detection electrodes Dete1, Dete2, Dete3, and the like (thinner than the common electrode) in a stripe arrangement, for example. Those detection electrodes Dete1, Dete2, Dete3, and the like are arranged orthogonal to the common electrode (Tx), or intersecting the common electrode (X direction or Y direction).

The common electrode COME and the detection electrode DETE are arranged at a certain interval. Basically, the capacitance Cc (Baseline capacitance) exists between the common electrodes Come1, Come2, Come3, . . . , and the detection electrodes Dete1, Dete2, Dete3, . . . , respectively. Each baseline (Baseline capacitance) is a predetermined value depending on the device. Each baseline (Baseline capacitance) may be stored in the control circuit or host device or other component. Each baseline (Baseline capacitance) may be measured in the absence object O1 and O2.

The predetermined voltage is applied to the common electrodes (Come) for a video display period (display period), and the drive pulse is applied to them for a touch detection period (detection period). During the detection period, the common electrode (Come) serves as the drive electrode (Tx).

The common electrodes Come1, Come2, Come3, . . . , that is, the drive electrodes Tx during touch detection are scanned with the drive pulse (Sig) at predetermined cycles. Assuming that the user's finger exists in proximity to the intersection between the detection electrode Dete2 and the drive electrode Tx2, the detection electrode Rx (Dete1, Dete2, Dete3, . . . ) exhibits the pulse-like waveform upon supply of the drive pulse (Sig) to the drive electrode Tx2. Then the pulse with the amplitude lower than the pulse derived from the other detection electrode is obtained from the detection electrode Dete2. The detection electrode Rx (Dete1, Dete2, Dete3, . . . ) monitors the fringe field from the drive electrode Tx (Come1, Come2, Come3, . . . ) to have the effect of shielding the fringe field upon proximity of the conductive object such as the finger. Shielding of the fringe field lowers the detected potential of the detection electrode Rx.

In the mutual detection mode, the detected potential difference may be used as the detection pulse for the position DETP. The illustrated capacitance Cx varies depending on the case whether or not the user's finger is in proximity to the detection electrode DETE. The level of the detected pulse also varies depending on whether or not the user's finger is in proximity to the detection electrode DETE. Accordingly, proximity of the finger to the touch panel surface may be determined based on the amplitude level of the detected pulse. It is possible to detect the two-dimensional position of the finger above the touch panel surface based on the electrode drive timing and the detection pulse output timing in reference to the drive pulse Sig.

<Self Detection Mode>

Figure 3B:
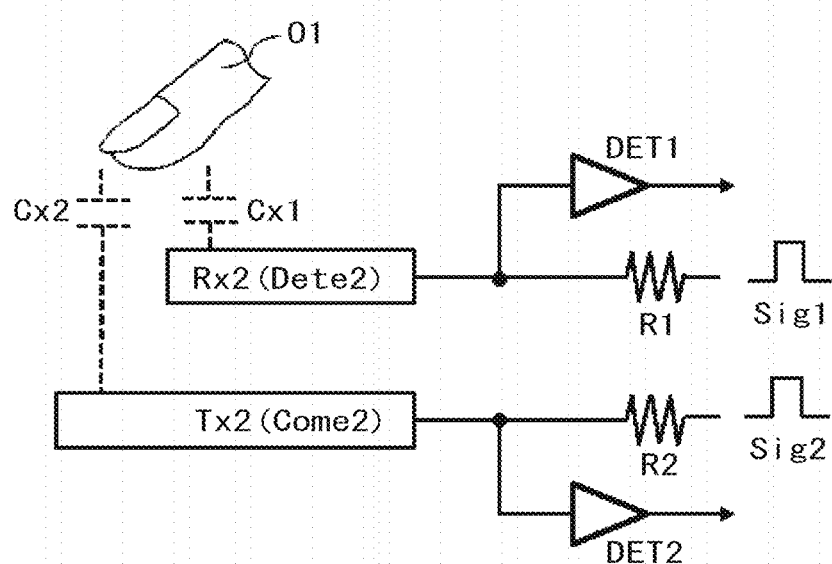
FIG. 3B illustrates a representative basic structure of the display device in self detection mode according to the embodiment.

FIG. 3B shows the exemplary configuration as a representative example of the self detection mode according to the embodiment. In the self detection mode, the self-detection drive pulse is supplied to the detection electrode DETE (Rx) and the common electrode COME (Tx) sequentially so as to detect the position and coordinates of the user's finger as the external proximity object. FIG. 3B exemplarily shows the detection electrode Dete2 (Rx2) and the common electrode Come2 (Tx2) as well as the state that the user's finger O1 is in proximity to or contact with the intersection between the detection electrode Dete2 (Rx2) and the common electrode Come2 (Tx2). The user's finger O1 increases the capacitance of the detection electrode Dete2 (Rx2) to the value derived from adding the capacitance Cx1 of the user's finger O1 to the self-capacitance of the Dete2 (Rx2). Likewise, the capacitance of the common electrode Come2 (Tx2) is increased to the value to which the self-capacitance of the Come2 (Tx2) and the capacitance Cx2 of the user's finger O1 are added. In the above-described state, the detection electrode Dete2 (Rx2) is driven first by the self detection drive pulse Sig1 via the resistance R1 so that the increased capacitance of the detection electrode Dete2 (Rx2) is charged by the self detection drive pulse Sig1. The detection circuit DET1 detects presence of the user's finger O1 around the detection electrode Dete2 (Rx2) based on the charging voltage value on the capacitance Cx1. Then the common electrode Come2 (Tx2) is driven by the self detection drive pulse Sig2 via the resistance R2 so that the increased capacitance of the common electrode Come2 (Tx2) is charged by the self detection drive pulse Sig2. The detection circuit DET2 detects presence of the user's finger O1 around the detection electrode Dete2 based on the charging voltage value on the capacitance Cx2. As a result, the user's finger O1 at the intersection between the detection electrode Dete2 (Rx2) and the common electrode Come2 (Tx2) is detected so as to further detect the position and coordinates of the user's finger O1 around the touch panel surface.

Although not shown in FIG. 3B, likewise the structure as shown in FIG. 3A, the common electrode COME (Tx) and the detection electrode DETE (Rx) are employed for the sensor. Likewise the structure as shown in FIG. 3A, the common electrode COME to be scanned by the self detection drive pulse Sig2 includes a plurality of stripe common electrodes Come1 (Tx1), Come2 (Tx2), Come3 (Tx3), and the like. Those common electrodes Come1 (Tx1), Come2 (Tx2), Come3 (Tx3) and the like are arranged in the Y direction or in the X direction. Similarly, the detection electrode DETE sequentially driven (scanned) by the self detection drive pulse Sig1 includes a plurality of stripe detection electrodes Dete1 (Rx1), Dete2 (Rx2), Dete3 (Rx3) and the like (actually, thinner than the stripe common electrode likewise the structure shown in FIG. 3A). Those detection electrodes Dete1 (Rx1), Dete2 (Rx2), Dete3 (Rx3) and the like are arranged in the direction orthogonal to or intersecting the common electrodes Come1 (Tx1), Come2 (Tx2), Come3 (Tx3), and the like (in the X direction or in the Y direction). With the structure as shown in FIG. 3B, both the detection electrodes Dete1 (Rx1), Dete2 (Rx2), Dete3 (Rx3) and the like, and the common electrodes Come1 (Tx1), Come2 (Tx2), Come3 (Tx3) and the like are driven (scanned) sequentially in the self detection mode so as to allow detection of the position of the external proximity object O1 at the intersection between the detection electrodes Dete1 (Rx1), Dete2 (Rx2), Dete3 (Rx3) and the like, and the common electrodes Come1 (Tx1), Come2 (Tx2), Come3 (Tx3) and the like. During the detection period in the self detection mode, the detection electrodes Dete1 (Rx1), dete2 (Rx2), Dete3 (Rx3) and the like, and the common electrodes Come1 (Tx1), Come2 (Tx2), Come3 (Tx3) and the like may be regarded as the detection electrodes.

In the self detection mode, it is possible to drive only the detection electrodes Dete1 (Rx1), Dete2 (Rx2), Dete3 (Rx3) and the like with the self detection drive pulse Sig1 when the touch sensor is set in the power saving mode, and detect existence of the external proximity object such as the finger so as to detect coordinates thereof by switching the mode to the mutual detection mode.

Although not shown in FIGS. 3A and 3B, the sensor may be configured to select the detection mode between the mutual detection mode and the self detection mode through the switch or the like. The configuration in the self detection mode is a mere example in a nonrestrictive manner.

Figure 4A:
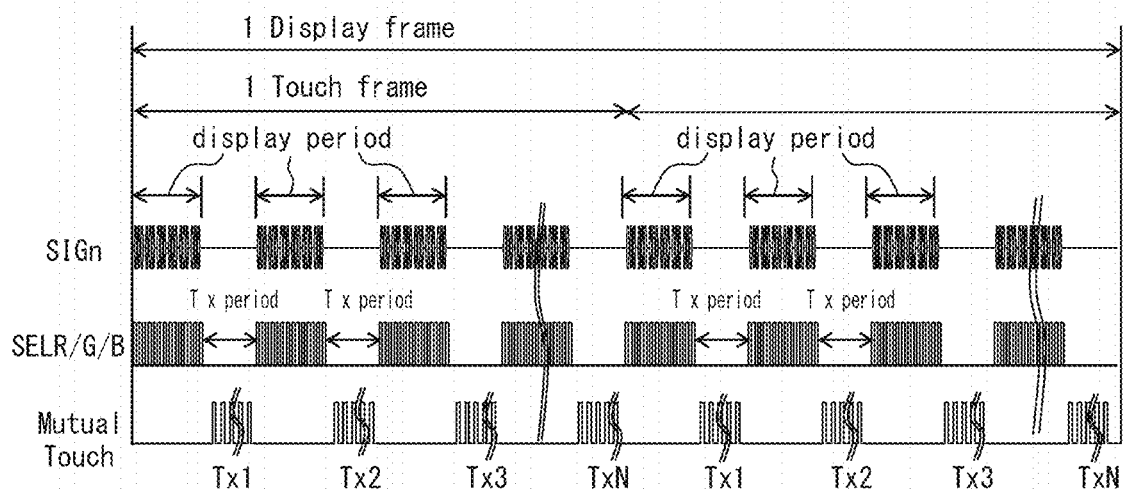
FIG. 4A is an explanatory diagram of the mutual detection method for driving the display device DSP with sensor according to the embodiment.
Figure 4B:
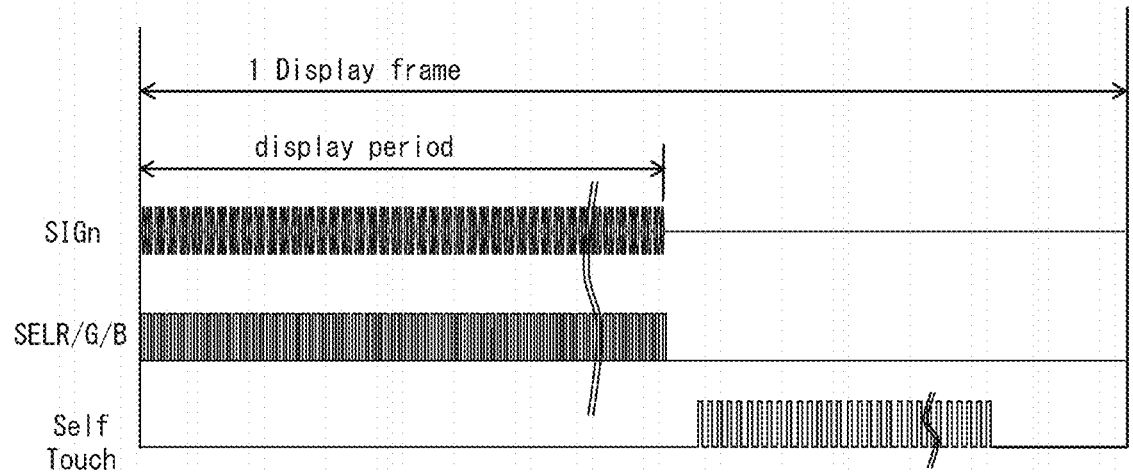
FIG. 4B is an explanatory diagram of the self detection method for driving the display device DSP with sensor according to the embodiment.

FIGS. 4A and 4B are explanatory views with respect to the method for driving the display device DSP with sensor according to the embodiment in the mutual detection mode and the self detection mode. As described above, since the common electrodes COME used for image display are commonly used for sensing the touch position, the video display operation and the touch position sensing operation will be activated in time division (time sharing).

In the mutual detection mode as shown in FIG. 4A, each of the image display period and the touch position detection period (Tx period) is divided. The divided video display periods and the divided touch position detection periods are alternately repeated to form a single frame display period. In other words, operations for outputting the video signal (SIGn) corresponding to the signal (SEL R/G/B) for selecting color from three colors of RGB are executed with respect to a plurality of divided display rows. Then the mutual detection is executed by inputting the drive pulse Sig to the divided drive electrodes Tx. The above-described operation is executed sequentially with respect to the divided display rows and drive electrodes Tx repeatedly. In this example, 2-touch detection frame is performed for the 1-display frame. During the 1-touch detection frame period, the drive electrodes Tx1, Tx2, Tx3 and the like are sequentially scanned with the drive pulse Sig for detecting the touch position.

In the self detection mode as shown in FIG. 4B, the self detection is executed by inputting the self detection drive pulse (Sig1) to all the detection electrodes DETE after displaying the 1-frame video image. That is, operations for outputting the video signals corresponding to those (SELR/G/B) for color selection from three colors (RGB) are executed for all the display rows, and then the self detection operation is executed by inputting the self detection drive pulse (Sig1) to all the detection electrodes DETE. It is possible to execute the self detection operation by scanning all the detection electrodes DETE (Rx) with the self detection drive pulse (Sig1), and then scanning all the common electrodes COME (Tx) with the self detection drive pulse (Sig2). The sensing operation is collectively executed without division in the self detection mode so that the detection sensitivity is enhanced by obtaining the sensing data as a whole. The self detection mode allows the sensing operation with higher sensitivity compared with the mutual detection mode. It is possible to execute the self sensing during the detection period as shown in FIG. 4A without being limited to the mode as shown in FIG. 4B (division mode).

The sensor structure according to the embodiment will be described referring to the drawings. In the following description, the common electrodes Come1, Come2, Come3 and the like will be designated with codes Tx1, Tx2, Tx3 and the like indicating the drive electrodes. The detection electrodes Dete1, Dete2, Dete3 and the like will be designated with codes Rx1, Rx2, Rx3 and the like, respectively. For easy understanding and clear viewing of the drawings, the drive electrodes (Tx1, Tx2, and the like) are drawn with dotted lines, and the detection electrodes (Rx1, Rx2 and the like) are drawn with solid lines, respectively. The auxiliary wirings (monitor wirings)(M1, M2 and the like) are drawn with thick solid lines, and the lead-out lines (W11, W12, and the like) are drawn with thin solid lines.

Figure 5:
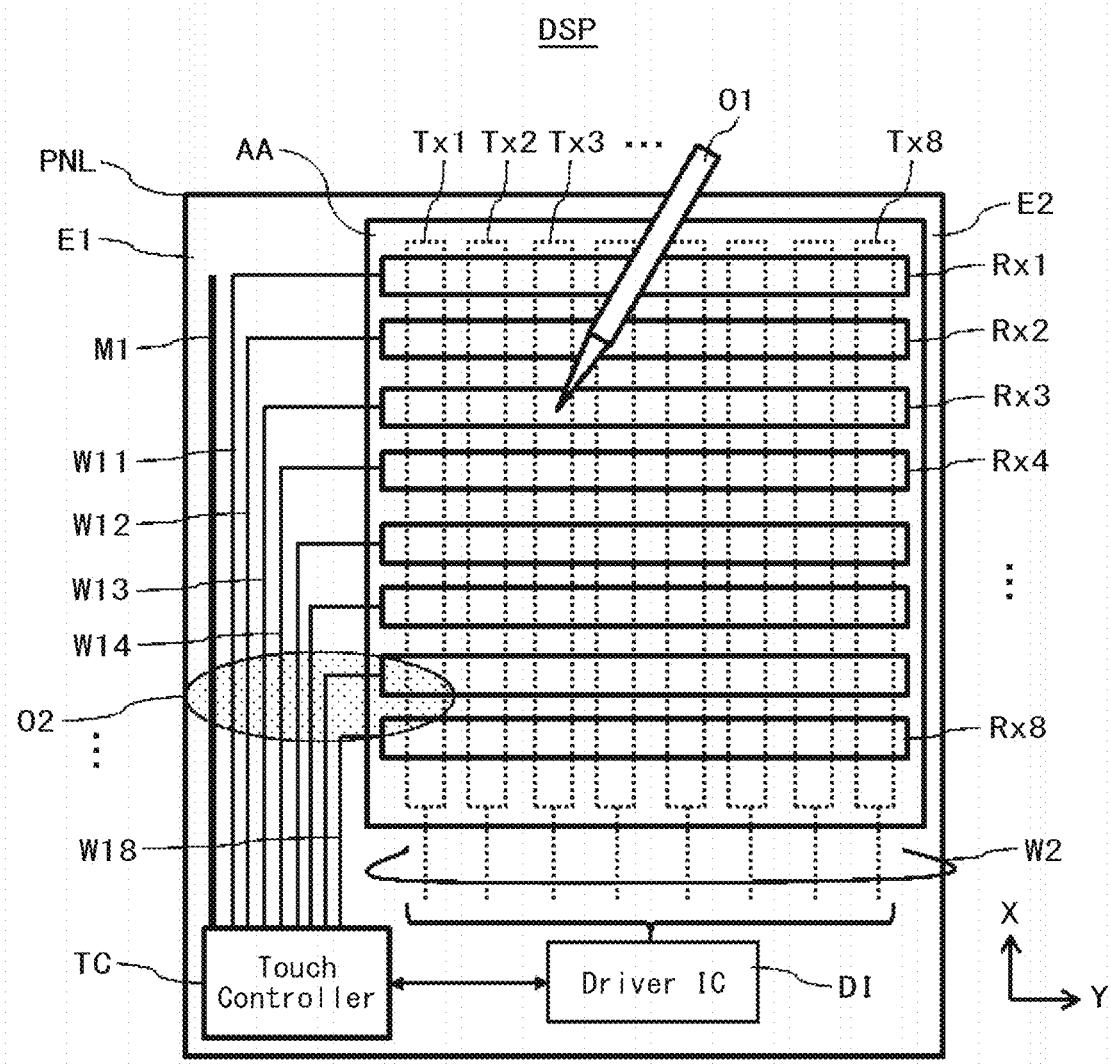
FIG. 5 is a plan view showing an exemplary structure of the sensor provided for the display device DSP with sensor according to the embodiment.

FIG. 5 is a plan view showing an exemplary structure of the sensor for the display device DSP with sensor according to the embodiment. The display device DSP with sensor includes the display panel PNL having an active region (touch detection region) AA of the sensor, and a peripheral region (frame region) around the active region. Referring to the drawing, the display panel PNL includes a first side (left side), a second side (right side) facing the first side, a third side (upper side) between the first side and the second side, and a fourth side (lower side) facing the third side. The frame region (peripheral region) around the active region (touch detection region) AA of the sensor includes a left frame region E1 and a right frame region E2.

As illustrated in the drawing, the active region AA of the sensor includes the drive electrodes Tx1, Tx2, Tx3, ..., Tx8 which are arranged parallel to one another in the X direction (first direction), and the detection electrodes Rx1, Rx2, Rx3, ..., Rx8 which are arranged parallel to one another in the Y direction (second direction) intersecting the X direction.

Referring to FIG. 5, the auxiliary wiring (monitor wiring) M1, a plurality of lead-out wirings W11, W12, W13, W14, ..., W18 connected to the detection electrodes Rx1, Rx2, Rx3, ..., Rx8 are disposed on the left frame region E1. The auxiliary wiring (monitor wiring) M1, and the lead-out wirings W11, W12, W13, W14, ..., W18 are connected to the touch detection circuit (touch controller, control circuit) TC. The auxiliary wiring (monitor wiring) M1 is disposed between the lead-out wiring W11 connected to the detection electrode Rx1 and the left side of the display panel PNL so as to be parallel to the lead-out wirings W11, W12, W13, W14, ..., W18. The auxiliary wiring (monitor wiring) M1 is disposed parallel to the lead-out wiring W11 outside the outermost one (lead-out wiring 11) of those wirings of W11, W12, W13, W14, ..., W18. The drawing shows the part defined by the detection electrodes and the auxiliary wirings (monitor wirings) in the form of straight lines for easy understanding. However, the part may be defined in the form of the bent line.

The drive electrodes Tx1, Tx2, Tx3, ..., Tx8 are connected to a display controller DI, Driver IC for example, via the lead-out wirings W2 and the common electrode drive circuit CD (not shown) so as to be driven sequentially with the drive pulse Sig from the common electrode drive circuit CD in accordance with the instruction from the display controller DI during the touch sensor detection period.

Operations in the mutual detection mode will be described. In this case, it is assumed that the object O1 such as the stylus pen is in proximity to the intersection between the drive electrode Tx3 and the detection electrode Rx3, for example, and the object O2 such as the user's finger or palm exists around the auxiliary wiring M1 and the lead-out wirings W11 to W18 on the frame region E1. In the above-described case, the parasitic capacitance is added to the auxiliary wiring M1 and the lead-out wirings W11 to W18. In the case that the object O2 exists around the auxiliary wiring M1 and the lead-out wirings W11 to W18, variation of the potential detected by the detection electrode Rxn (corresponding to Rx1-Rx8 as shown in FIG. 5) upon driving of the drive electrode Tx1 becomes smaller compared with the case that the object O2 does not exist. In other words, it is determined that the capacitance value at the intersection between the drive electrode Tx1 and the detection electrode Rxn (corresponding to Rx1-Rx8 as shown in FIG. 5), which is detected by the touch detection circuit (touch controller, control circuit) TC is smaller than the predetermined value, thus causing misdetection. In the case that the object O2 in the electrically floating state exists around the lead-out wirings W11 to W18, and the region AA of the sensor, the capacitance coupling between the drive electrode Tx1 and the lead-out wirings W11-W18 allows inflow of the charge of the drive electrode Tx1 to the lead-out wirings W11-W18. It is then observed that the signal level of the stylus O1 existing around the region AA of the sensor is lowered.

In order to solve the above-described problem, the auxiliary wiring (monitor wiring) M1 is provided.

Assuming that the capacitance value in the presence of the object O1 around the active region (touch detection region) AA of the sensor is set to Cap(w/ Object), and the capacitance value (baseline) in the absence of the object O1 is set to Cap(w/o Object), the signal Delta (Object) of the object O1 will be expressed as below. In this case, w/o represents "without", and w/ represents "with".

$$\text{Delta(Object)}=\text{Cap(w/o Object)}-\text{Cap(w/ Object)}$$

In the presence of the object O2 around the frame region E1, and presence of the coupling noise 1 (noise1) between the drive electrode Tx1 and the lead-out wires W11-W18 on the frame region E1, the signal of the object O1 (first detection value) will be expressed as below.

$$\text{Delta(Object)}=\text{Cap(w/o Object)}-\text{Cap(w/ Object)}+\text{noise1}$$

In the presence of the object O2 around the frame region E1, and presence of the coupling noise 2 (noise2) between the drive electrode Tx1 and the auxiliary wiring M1 on the frame region E1, the signal (second detection value) Delta (monitor1) of the auxiliary wiring (monitor wiring) on the frame region E1 may be regarded as the noise 2 (noise2) as expressed by the following formula.

$$\text{Delta(monitor1)}=\text{noise2}$$

Taking the noise 1 and the noise 2 into account, it is possible to correct influence of the noise 1 and the noise 2 by setting the signal change value (third detection value) (Delta_new) as expressed by the following formula. The above correction has been described for the explanatory purpose in a nonrestrictive manner.

$$\text{Delta\_new}=\text{Delta(Object)}-\text{Delta(monitor1)}$$

It is possible to detect existence of the object O2 through the auxiliary wiring M1 so as to change the subsequent detection algorithm.

The detection algorithm is controlled by either control unit including the touch control unit, or the drive control unit, or an external host connected to the display device.

The coordinates of the touch position of the object O1 is accurately obtained in reference to the information detected in the active region (touch detection region) AA of the sensor, and the information detected by the auxiliary wiring M1.

Figure 6A:
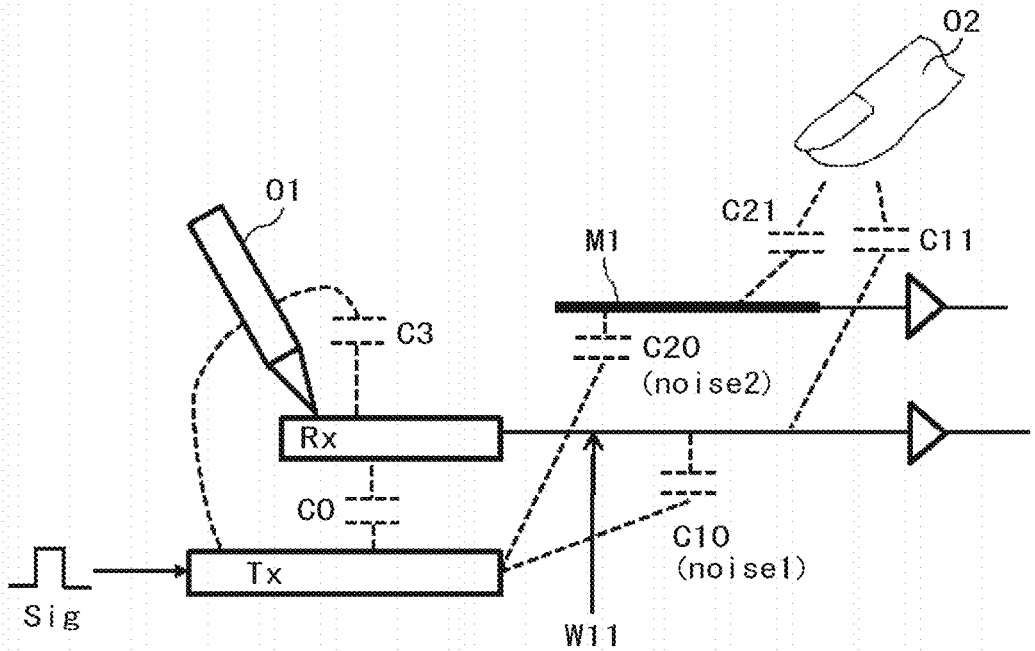
FIG. 6A is an explanatory diagram showing the display device having an auxiliary wiring.
Figure 6B:
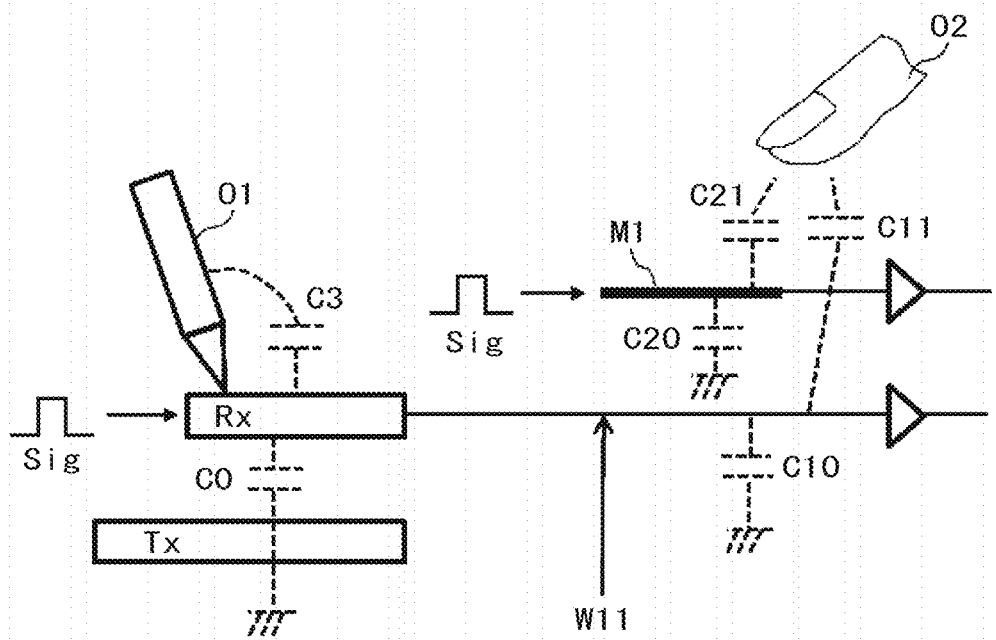
FIG. 6B is an explanatory view showing the display device having the auxiliary wiring.

FIG. 6A is a conceptual explanatory diagram of the structure having the auxiliary wiring M1 in the mutual detection mode. FIG. 6B is a conceptual explanatory diagram of the structure having the auxiliary wiring M1 in the self detection mode using the detection electrode Rx.

FIG. 6A shows the drive electrode Tx, the detection electrode Rx, and the object O1 such as the stylus pen on the detection electrode Rx. The capacitance value of the capacitance C0 corresponds to Cap(w/o Object) as the reference capacitance value (Baseline) between the drive electrode Tx and the detection electrode Rx in the absence of the object O1. The synthetic capacitance value derived from the values of the capacitance C0 and the capacitance C3 corresponds to Cap(w/ Object) in the presence of the object O1. In the presence of the object O1, the fringe field is partially blocked by the object O1 so that the capacitance value between the drive electrode Tx and the detection electrode Rx becomes small while operating as if the capacitance C3 were added between the object O1 and the detection electrode Rx. The drawing further shows the lead-out wiring W11 (for exemplifying purpose) of the detection electrode Rx, and the auxiliary wiring M1. The coupling capacitance between the drive electrode Tx and the lead-out wiring (W11) is set to C10, and the coupling capacitance between the drive electrode Tx and the auxiliary wiring M1 is set to C20. The capacitance C10 is the cause of noise 1 (noise1), and the capacitance C20 is the cause of noise 2 (noise2).

As described above, the auxiliary wiring M1 allows the signal change (Delta_new) in consideration of the noise 1 and noise 2 to be accurately obtained.

FIG. 6A is a conceptual explanatory diagram of the state during mutual detection showing the drive electrode Tx, the detection electrode Rx, the object O1 such as the stylus pen in contact with the detection electrode Rx, and the object O2 such as the user's finger or hand or palm in proximity to or contact with the auxiliary wiring M1 and the lead-out wiring W11.

The capacitance C0 between the drive electrode Tx and the detection electrode Rx is the reference value in the absence of the objects O1 and O2. The capacitance C10 between the lead-out wiring W11 and the drive electrode Tx is the capacitance value in the absence of the objects O1 and O2. The reference capacitance value (Baseline) of the detection electrode Rx is detected as the total value of the capacities C0 and C10. The capacitance C20 between the auxiliary wiring M1 and the drive electrode Tx is the value in the absence of the object O2. The value of the capacitance C20 is set to the reference capacitance value (Baseline) of the auxiliary electrode M1.

If the object O1 is in contact with the detection electrode Rx, the fringe field from the drive electrode Tx is at least partially blocked by the object O1 as if in the presence of the capacitance C3. In the state where the object O2 such as the user's finger or hand or palm is in proximity or contact with the auxiliary wiring M1 and the lead-out wiring W11, the capacitance exists between the auxiliary wiring M1 and the object O2, and the capacitance exists between the lead-out wiring W11 and the object O2. In the above-described case, the fringe field between the lead-out wiring W11 and the object O2 is at least partially blocked, and the fringe field between the lead-out wiring W11 and the object O2 is at least partially blocked while operating as if in the presence of the capacitance C21 between the auxiliary wiring M1 and the object O2, and the capacitance C11 between the lead-out wiring W11 and the object O2.

The capacitance values (baseline) of the detection electrode Rx and the auxiliary wiring M1 in the absence of the objects O1 and O2 are expressed by the following formulae.

Baseline capacitance value of detection electrode
$Rx$:Baseline($Rx$)=$C0+C10$

Baseline capacitance value of auxiliary wiring
$M1$:Baseline($M1$)=$C20$

In the presence of the objects O1 and O2, the capacitance value (actual measurement) Cap(nm) of the detection electrode Rx to be detected during the touch detection period is expressed by the following formula.

$Cap(nm)=C0+C10+C11+C3$

In the presence of the objects O1 and O2, the capacitance value (actual measurement) Cap(M1) of the auxiliary wiring M1 to be detected during the touch detection period is expressed by the following formula.

$Cap(M1)=C20+C21$

As the auxiliary wiring M1 and the lead-out wiring W11 are located relatively adjacent to each other, the value of the capacitance C21 is thought to be substantially the same as that of the capacitance C11. Therefore the relationship between the capacitances C21 and C11 is expressed by the following formula.

$C21 \approx C11$

Alternatively, for accurate calculation, the relationship between capacitances C21 and C11 may be expressed by the following formula.

$\alpha C21 = C11$ where α denotes the predetermined constant in accordance with the positional relationship between the auxiliary wiring M1 and the lead-out wiring W11.

The capacitance C21 between the auxiliary wiring M1 and the object O2 may be obtained by the formula of C21=Cap(M1)−Baseline(M1). The capacitance C3 may further be obtained by the following formulae.

$C3=Cap(nm)-(C0+C10)-C11$ $C3=Cap(nm)-Baseline(Rx)-C11$ $C3=Cap(nm)-Baseline(Rx)-C21(C11 \neq C21)$ As described above, the auxiliary wiring M1 allows the capacitance change of the lead-out wiring (W11) caused by the object O2 to be obtained in reference to the capacitance change of the auxiliary wiring M1 caused by object O2. This makes it possible to detect the capacitance C3 by eliminating the influence of the object O2 so as to improve accuracy of detection with respect to the position of the object O1. At this time, determination is made whether the object O1 is in proximity or contact state in accordance with the value of the capacitance C3 in the presence of the object O1. In other words, if the value of the capacitance C3 in the presence of the object O1 is larger than the predetermined value, it is determined that the object O1 is in proximity or contact state.

FIG. 6B is a conceptual explanatory view of the state during self detection, showing the drive electrode Tx, the detection electrode Rx, the object O1 such as the stylus pen in contact with the detection electrode Rx, and the object O2 such as the user's finger or hand or palm in proximity to or contact with the auxiliary wiring M1 and the lead-out wiring W11.

Self detection of the detection electrode Rx and the auxiliary wiring M1 is executed by, for example, applying the drive pulse to the detection electrode Rx and the auxiliary wiring M1 through the method as shown in FIG. 3B to measure the amplitude level and the like, but not limited thereto. At this time, the drive electrode Tx receives application of the predetermined DC voltage (DC), or is brought into the floating state.

The capacitance C0 is generated between the detection electrode Rx and the reference potential such as ground potential in the absence of the objects O1 and O2. If the predetermined DC voltage (DC) is applied to the drive electrode Tx, the capacitance C0 contains the one between the detection electrode Rx and the drive electrode Tx. The capacitance C10 is generated between the lead-out wiring W11 and the reference potential such as the ground potential in the absence of the object O1. The reference capacitance value of the capacitance (Baseline) of the detection electrode Rx is detected as the total value of the capacitances C0 and C10. The capacitance C20 is generated between the auxiliary wiring M1 and the reference potential such as the ground potential in the absence of the object O2 so that the resultant value is set to the reference capacitance value (Baseline) of the auxiliary electrode M1.

In the case that the object O1 is in contact with or proximity to the detection electrode Rx, the capacitance C3 exists between the object O1 and the detection electrode Rx. In the case that the object O2 such as the user's finger or hand is in contact with or proximity to the auxiliary wiring M1 and the lead-out wiring W11, the capacitance C21 exists between the auxiliary wiring M1 and the object O2, and the capacitance C11 exists between the lead-out wiring W11 and the object O2.

Capacitance values (baseline) of the detection electrode Rx and the auxiliary wiring M1 in the absence of the objects O1 and O2 are expressed by the following formulae.

Baseline capacitance value of detection electrode
Rx:Baseline($Rx$)=C0+C10

Baseline capacitance value of auxiliary wiring
$M1$:Baseline($M1$)=C20

The capacitance value (actual measurement)Cap(nm) of the detection electrode Rx detected during the touch detection period in the presence of the objects O1 and O2 is expressed by the following formula.

Cap(nm)=C0+C10+C11+C3

The capacitance value (actual measurement) Cap(M1) of the auxiliary wiring M1 detected during the touch detection period in the presence of the objects O1 and O2 is expressed by the following formula.

Cap($M1$)=C20+C21

As the auxiliary wiring M1 and the lead-out wiring W11 are located adjacently to each other, each of the capacitance values C21 and C11 is thought to be substantially the same. Therefore, the relationship between the capacitances C21 and C11 is expressed by the following formula.

$C21 \neq C11$

Alternatively, the relationship between the capacitances C21 and C11 for accurate calculation is expressed by the following formula.

$\alpha$C21=C11

The coefficient $\alpha$ is the constant preliminarily obtained in accordance with the positional relationship between the auxiliary wiring M1 and the lead-out wiring W11.

Therefore, the capacitance C21 between the auxiliary wiring M1 and the object O2 is obtained by the formula of C21=Cap(M1)−Baseline(M1). The capacitance C3 may be obtained as follows.

C3=Cap(nm)−(C0+C10)−C11

C3=Cap(nm)−Baseline($Rx$)−C11

C3=Cap(nm)−Baseline($Rx$)−C21(C11$\neq$C21)

As described above, even in the self detection mode, the auxiliary wiring M1 allows the capacitance change of the lead-out wiring (W11) caused by the object O2 to be obtained in reference to the capacitance change of the auxiliary wiring M1 caused by the object O2. This makes it possible to detect the capacitance C3 by eliminating the influence of the object O2 so as to improve accuracy of detection with respect to the position of the object O2. At this time, determination is made whether the object O1 is in proximity or contact state in accordance with the value of the capacitance C3 in the presence of the object O1. In other words, if the value of the capacitance C3 in the presence of the object O1 is larger than the predetermined value, it is determined that the object O1 is in proximity or contact state.

Figure 7:
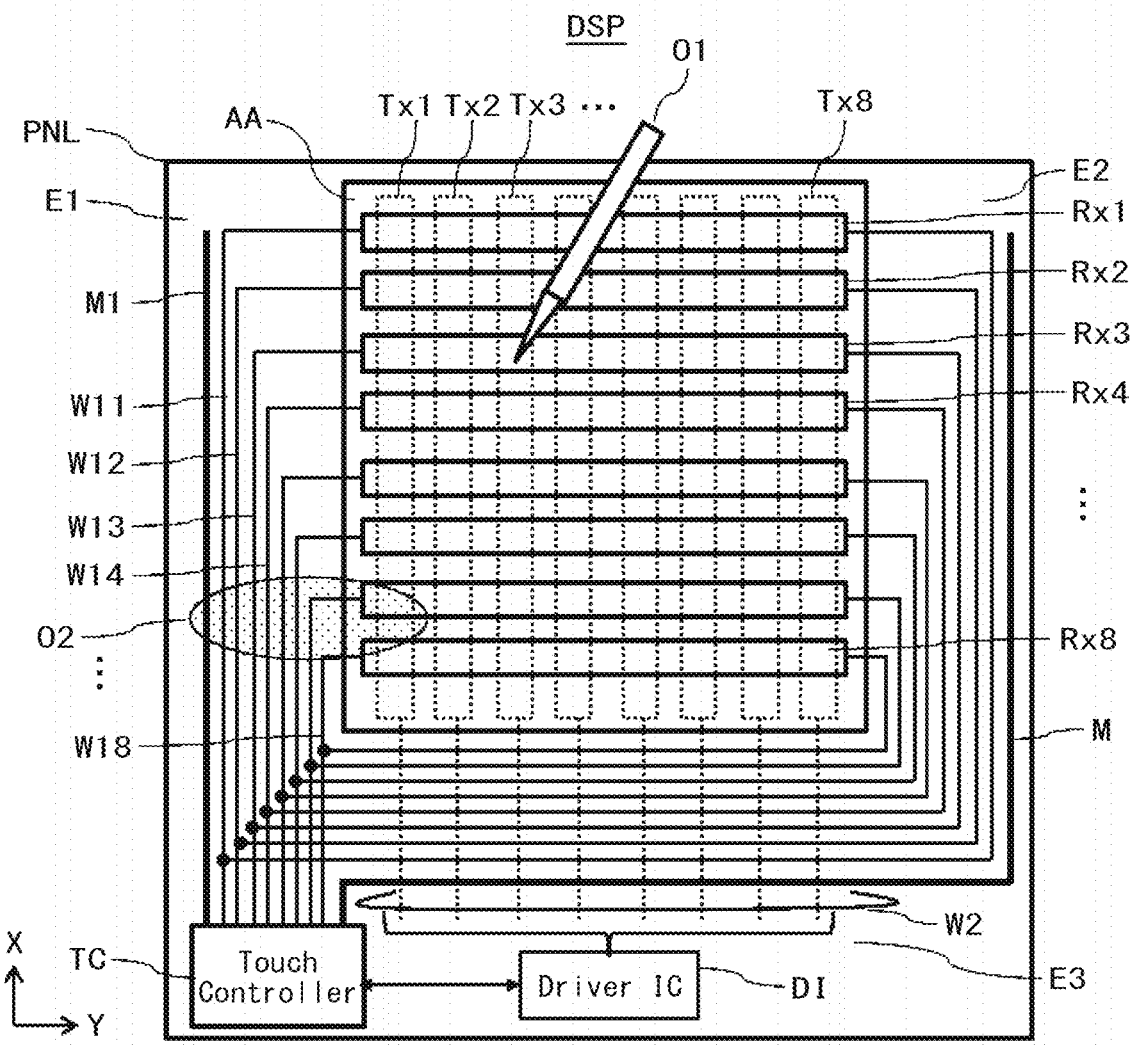
FIG. 7 is a plan view showing another exemplary structure of the sensor provided for the display device DSP with sensor according to the embodiment.

FIG. 7 is a plan view showing another exemplary structure of the sensor for the display device DSP with sensor according to the embodiment. This structure is different from the one as shown in FIG. 5 in that each of the detection electrodes Rx1, Rx2, Rx3, . . . , Rx8 has both ends connected to the respective lead-out wirings W11, W12, W13, W14, . . . , W18 to form a loop, and two auxiliary wirings (monitor wirings) M1, M2 are disposed. The auxiliary wiring M2 exists between the second side (right side) and the outermost wiring W11 parallel thereto on the frame region E2. The auxiliary wiring M2 exists between the fourth side (lower side) and the outermost wiring W11, or between the display controller DI (Driver IC) and the outermost wiring W11 on the frame region E3 parallel to the outermost lead-out wiring W11. The other structure is the same as that of the sensor as shown in FIG. 5, and detailed explanation thereof, thus, will be omitted. The drawing shows the part defined by the detection electrodes and the auxiliary wirings (monitor wirings) in the form of straight lines for easy understanding. However, the part may be defined in the form of the bent line.

It is possible to detect existence of the object O2 around the frame regions E1, E2, and E3 using the auxiliary wirings M1, M2. The coordinates of the touch position of the object O1 may be correctly obtained in reference to the detection information on the active region (touch detection region) AA of the sensor, and the detection information derived through the auxiliary wirings M1, M2.

The signal calculation algorithm of the object O1, and the processing algorithm in the presence of the object O2 as indicated by the structure of FIG. 7 will be described referring to FIGS. 8 and 9.

Figure 8:
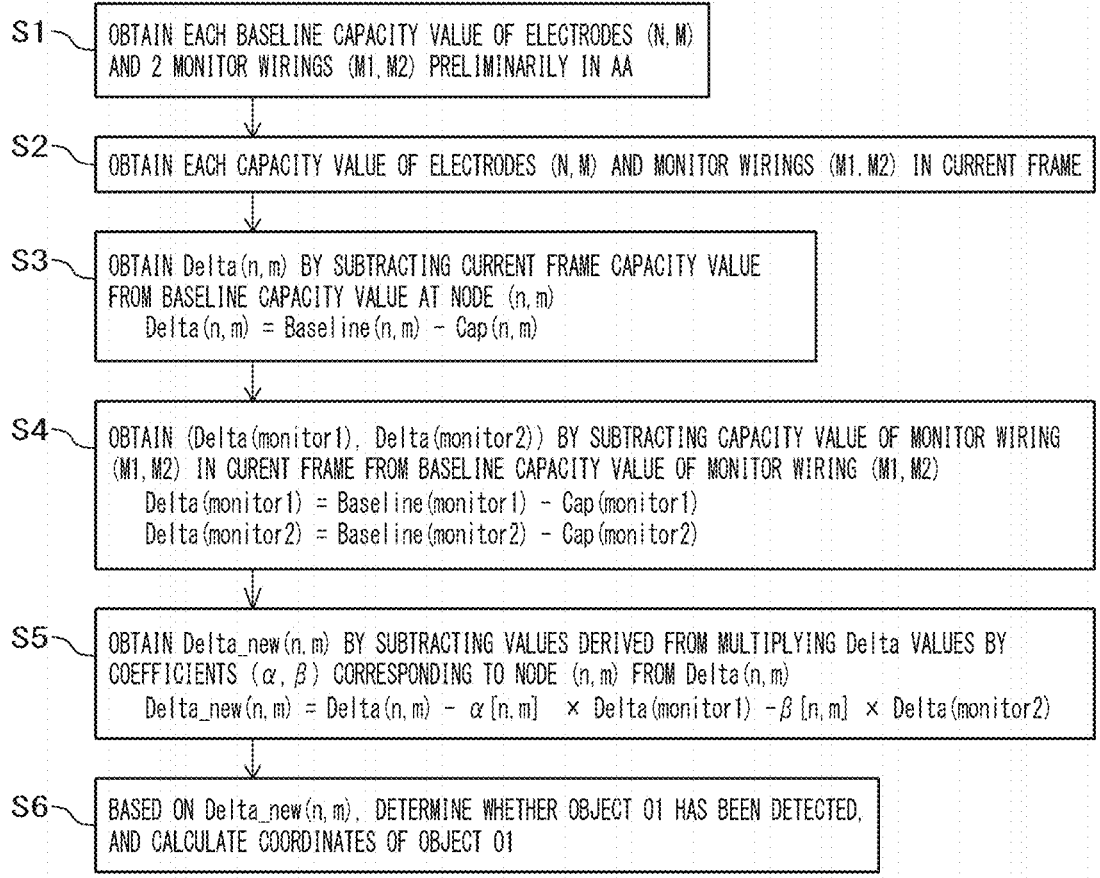
FIG. 8 represents a signal calculation algorithm for the display device DSP with sensor including two auxiliary wirings (monitor wirings)

FIG. 8 represents the signal calculation algorithm for the display device DSP with sensor including the two auxiliary wirings (monitor wirings). It is assumed that the signal calculation algorithm is executed for the case of N detection electrodes Rx, M drive electrodes Tx, and two auxiliary wirings (monitor wirings). This algorithm is applicable to the case where two auxiliary wirings (monitor wirings) M1, M2 are provided as shown in FIG. 7. The description will be made on the assumption that the auxiliary wirings M1, M2 serve as the monitor wirings M1, M2.

In step S1, reference baseline capacitance values of N×M electrodes and two monitor wirings (monitor1, monitor2) in the active region AA of the sensor are obtained preliminarily. The respective baseline capacitance values represent the reference capacitance value at the intersection between the nth detection electrode Rx and the mth drive electrode Tx, the reference capacitance value of the monitor wiring M1 (monitor1), and the reference capacitance value of the monitor wiring M2 (monitor2) in the absence of the object O1 in the active region AA of the sensor. In this case, the term "n" denotes an integer from 1 to N, and the term "m" denotes an integer from 1 to M. The Baseline capacitance value may be periodically obtained in the absence of the object O1 in the active region AA of the sensor.

In step S2, measured and obtained are the capacitance values of N×M, that is, Cap(n,m) in the active region AA of the current frame, and the capacitance values of the monitor wirings M1 and M2, that is, Cap(monitor1) and Cap(monitor2) upon scanning of each of M drive electrodes Tx with the drive pulse Sig.

In step S3, the capacitance value Cap(n,m) at the node (n,m) of the current frame, which has been obtained in step S2 is subtracted from the Baseline capacitance value Baseline(n,m) at the node (n,m), which has been obtained in step S1 so as to calculate the signal change value (first detection value) Delta(n,m). That is, the signal Delta(n,m) is calculated by the following formula. The term (n,m) denotes the intersection between the nth detection electrode Rx and the mth drive electrode Tx.

$$\text{Delta}(n,m) = \text{Baseline}(n,m) - \text{Cap}(n,m)$$

In step S4, the capacitance value (Cap(monitor1) of the monitor wiring M1 and the capacitance value (Cap(monitor2) of the monitor wiring M2 of the current frame, which have been obtained in step S2 are subtracted from the Baseline capacitance values (Baseline(monitor1), Baseline(monitor2)), which have been obtained in step S1, respectively so as to calculate the signal change values (second detection value), that is, Delta(monitor1) and Delta(monitor2) of the monitor wirings M1, M2. In other words, the signal change values Delta(monitor1) and Delta(monitor2) are calculated by the following formulae.

$$\text{Delta}(\text{monitor1}) = \text{Baseline}(\text{monitor1}) - \text{Cap}(\text{montor1})$$

$$\text{Delta}(\text{monitor2}) = \text{Baseline}(\text{monitor2}) - \text{Cap}(\text{monitor2})$$

In step S5, the value derived from multiplying the Delta (monitor1) by coefficient α corresponding to the node (n,m), and the value derived from multiplying the Delta(monitor2) by coefficient β corresponding to the node (n,m) in step S4 are subtracted from the Delta value (Delta(n,m)) of the signal Delta(n,m) obtained in step S3 for each node to calculate the value of the signal change (Delta_new) at the node (n,m). That is, the signal change value (third detection value) Delta_new is calculated by the following formula.

$$\text{Delta\_new}(n,m) = \text{Delta}(n,m) - \alpha[n,m] \times \text{Delta}(\text{monitor1})$$
$$\beta[n,m] \times \text{Delta}(\text{monitor2})$$

In the above formula, the coefficients α and β are predetermined values. The coefficients α and β can be set to zero.

Those coefficients α and β are determined in accordance with the following factors and so on.

1) Each shape and each length of the lead-out wirings W11, W12, W13, W14, . . . , W18, the auxiliary wirings M1, M2, and the detection electrodes Rx1, Rx2, Rx3, . . . , Rx8.
2) Each distance between the respective detection electrodes Rx1, Rx2, Rx3, . . . , Rx8 and the respective auxiliary wirings M1, M2.
3) Each width of the lead-out wirings W11, W12, W13, W14, . . . , W18
4) Each width of the auxiliary wirings M1, M2, and each distance between the drive electrodes Tx1, Tx2, Tx3, . . . , Tx8 and the lead-out wirings W11, W12, W13, W14, . . . , W18, respectively
5) Each distance between the drive electrodes Tx1, Tx2, Tx3, . . . , Tx8, and the auxiliary wirings M1, M2
6) Thickness of the liquid crystal layer In step S6, the signal change value Delta_new(n,m) at the node (n,m), which has been obtained in step S5 is used for detecting and determining existence of the object O1, and calculating its coordinates. The obtained values are sent to the host processor. For example, if the signal change value Delta_new(n,m) at the node (n,m) is larger than the predetermined value, it may be determined that the object (external proximity object) O1 has been in proximity to the active region (touch detection region) AA of the sensor. Identification of the node (n,m) at which the signal change value Delta_new is larger than the predetermined value allows determination of the coordinates of the touch position of the object O1.

In the above-described way, the coordinates of the touch position of the object O1 may be correctly obtained using the information derived from detection in the active region (touch detection region) AA of the sensor, and the information detected through the auxiliary wirings M1, M2.

The algorithm as shown in FIG. 8 will be executed at the respective nodes(n,m).

The algorithm as shown in FIG. 8 establishes the flow of calculating values at the respective nodes (intersections between Tx and Rx) as shown in FIG. 5 by omitting process steps of obtaining both the Baseline capacitance value and the capacitance value of the monitor wiring M2, and calculating Delta(monitor2) as well as eliminating the term of β[n,m]×Delta(monitor2) from the formula for calculating Delta_new(n,m).

Figure 9:
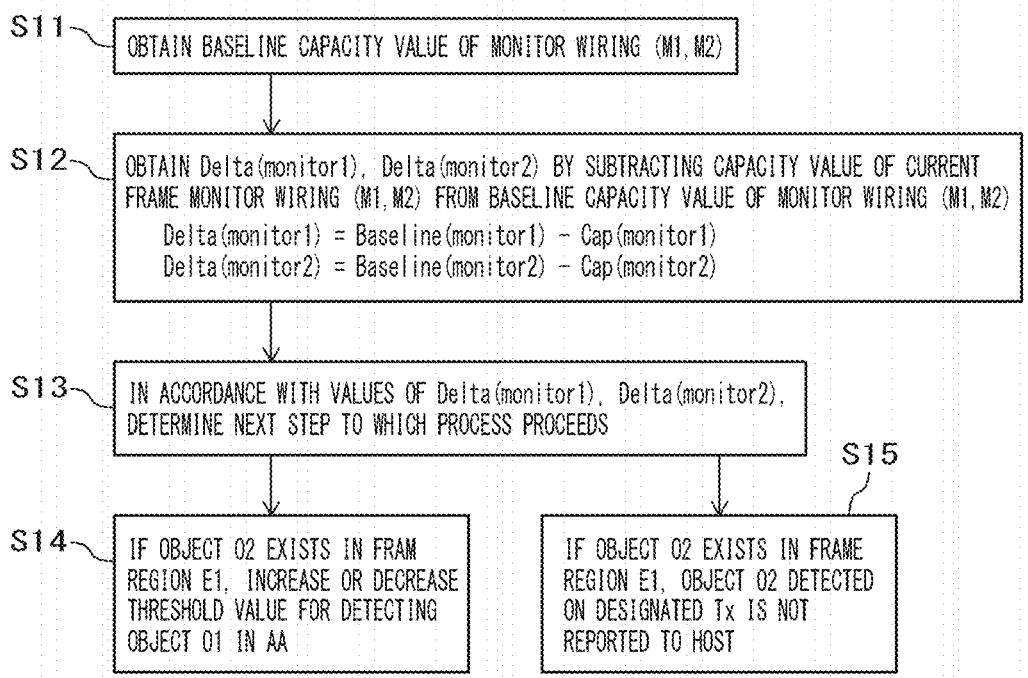
FIG. 9 is an explanatory diagram of the processing algorithm to be executed in the presence of an object O2 around a peripheral region E1.

FIG. 9 is an explanatory diagram of the processing algorithm in the presence of the object O2 around the peripheral region (frame region) E1.

In step S11, Baseline capacitance values of the auxiliary wirings (monitor wirings) M1, M2 are obtained.

In step S12, the capacitance values of the monitor wirings M1, M2 of the current frame are subtracted from the Baseline capacitance values of the monitor wirings M1, M2, respectively to calculate the signal change values Delta (monitor1) and Delta(monitor2). That is, the signal change values Delta(monitor1) and Delta(monitor2) are calculated by the following formulae.

$$\text{Delta}(\text{monitor1}) = \text{Baseline}(\text{monitor1}) - \text{Cap}(\text{monitor1})$$

$$\text{Delta}(\text{monitor2}) = \text{Baseline}(\text{monitor2}) - \text{Cap}(\text{monitor2})$$

In step S13, the subsequent step to be executed in either step S14 or S15 is determined in accordance with the signal change values Delta(monitor1) and Delta(monitor2).

If the process proceeds to step S14, and the presence of the object (O2) around the frame region E1 is determined, based on the signal change values Delta(monitor1) and Delta(moitor2), the required processing will be executed, for example, by increasing or decreasing the threshold value for detecting the object O1, for example, finger or the stylus pen in the active region AA.

If the process proceeds to step S15, and the presence of the object (O2) around the frame region E1 is determined, based on the signal change values Delta(monitor1), Delta (monitor2), the required processing will be executed, for example, by refraining from reporting on the object O2 detected around the designated drive wiring Tx to the host processor (Host) such as the application processor installed in the mobile phone.

The use of the processing algorithm as described above allows execution of the signal processing in the presence of the object O2 around the frame regions E1, E2, E3 as desired.

FIGS. 10 to 14 are schematic views for explaining steps as shown in FIG. 8. The explanation will be made on the assumption of four drive electrodes Tx, four detection electrodes Rx, and one auxiliary wiring (monitor wiring) for easy understanding.

FIG. 10 schematically shows arrangement of the drive electrodes, the detection electrodes, and the auxiliary wiring. FIG. 10 illustrates four drive electrodes Tx1, Tx2, Tx3, Tx4 arranged in the stripe pattern in the X direction, four detection electrodes Rx1, Rx2, Rx3, Rx4 arranged in the stripe pattern in Y direction, and the auxiliary wiring (monitor wiring) M1 disposed in the Y direction. The points (nodes) at which the drive electrodes Tx1, Tx2, Tx3, Tx4 and the detection electrodes Rx1, Rx2, Rx3, Rx4 intersect have coordinates of (1,1), (1,2), . . . , (4,4).

FIG. 11 schematically shows the Baseline capacitance values corresponding to the arrangement shown in FIG. 10. The Baseline capacitance values (Baseline(n,m)) between the drive electrodes Tx1, Tx2, Tx3, Tx4 and the detection electrodes Rx1, Rx2, Rx3, Rx4 at the coordinates of (1,1), (1,2), . . . , (4,4) are specified as B11, B12, B13, . . . , B44. The Baseline capacitance value (Baseline(monitor1)) of the auxiliary wiring (monitor wiring) M1 is specified as BM1.

FIG. 12 schematically shows the capacitance values derived from scanning of the drive electrodes as shown in FIG. 10. The measured capacitance values (Cap(n,m)) at the coordinates of (1,1), (1,2), . . . , (4,4) are specified as C11, C12, C13, . . . , C44. The measured capacitance value (Cap(monitor1)) of the auxiliary wiring (monitor wiring) M1 is specified as CM1.

FIG. 13 schematically shows the coefficients α corresponding to the arrangement shown in FIG. 10. The coefficients are specified as α11, α12, α13, . . . , α44 corresponding to the coordinates (1,1), (1,2), . . . , (4,4). The coefficient α can be set to zero. If the auxiliary wiring (monitor wiring) M2 is provided, the coefficients β used in step S5 as shown in FIG. 8 are specified as β11, β12, β14, . . . , β44 so as to be used for calculation.

FIG. 14A is a conceptual explanatory diagram of the change (Delta) in the respective capacitance values. Referring to FIG. 14A(a), 14A(b), 14A(c), 14A(d), the y-axis represents the capacitance value (C). The x-axis of the 14A(a), 14A(b) represents the auxiliary wiring M1, and the detection electrodes Rx1, Rx2, Rx3, Rx4. The x-axis of the 14A(c), 14A(d) represents the detection electrodes Rx1, Rx2, Rx3, Rx4.

FIG. 14A(a) schematically shows the Baseline capacitance value (Baseline(M1)) of the auxiliary wiring M1, and Baseline capacitance values (Baseline(n,m)) of the detection wirings Rx1, Rx2, Rx3, Rx4. In the mutual detection mode, the Baseline capacitance value (Baseline(M1)) of the auxiliary wiring M1 becomes the capacitance value between the auxiliary wiring M1 and the drive electrode Tx as shown in FIG. 6A. The Baseline capacitance values (Baseline(n,m)) of the detection wirings Rx1, Rx2, Rx3, Rx4 become capacitance values between the detection wirings Rx1, Rx2, Rx3, Rx4, and the drive electrode Tx.

FIG. 14A(b) schematically shows values of (Delta(M1)=Baseline(M1)−Cap(M1) obtained by subtracting the measured capacitance value (Cap(M1) of the auxiliary wiring M1 from the Baseline capacitance value (Baseline(M1)) during the detection period, and Delta(n,m)=Baseline(n,m)−Cap(n,m) obtained by subtracting the capacitance value (Cap(n,m)) measured at the predetermined drive electrode Tx with the coordinates of (1,1), (1,2), . . . , (4,4) from the Baseline capacitance value (Baseline(n,m)) during the detection period. In this case, the drive electrode Tx may be an arbitrary one among the drive electrodes Tx1, Tx2, Tx3, Tx4, taking a waveform in accordance with the selected drive electrode. Scanning of the drive electrodes Tx1, Tx2, Tx3, Tx4 sequentially with the drive signal Sig allows measurement of the capacitance values (Cap(n,m)) at the intersections between the drive electrode in the driven state, and the detection electrodes Rx1, Rx2, Rx3, Rx4.

FIG. 14A(c) schematically shows values (α[n,m]×Delta (M1)) obtained by multiplying the value Delta(M1) relative to the auxiliary wiring M1 by the coefficient α in accordance with the node (n,m).

FIG. 14A(d) schematically shows the value (Delta_new (n,m)) obtained by subtracting the capacitance value (α[n, m]×Delta(M1)) as shown in FIG. 14A(c) from the capacitance value (Delta(n,m)=Baseline(n,m)−Cap(n,m)) as shown in FIG. 14A(b), that is, the capacitance value under no influence of the object O2.

FIG. 14B is a conceptual explanatory diagram of the respective capacitance values expressed as actual capacitances. Referring to FIGS. 14B(a), 14B(b), 14B(c), 14B(d), the y-axis represents the capacitance value (C). The x-axis of the 14B(a), 14B(b) represents the auxiliary wiring M1, and the detection electrodes Rx1, Rx2, Rx3, Rx4. The x-axis of the 14B(c), 14B(d) represents the detection electrodes Rx1, Rx2, Rx3, Rx4.

FIG. 14B(a) schematically shows the Baseline capacitance value (Baseline(M1)) of the auxiliary wiring M1, and Baseline capacitance values (Baseline(n,m)) of the predetermined drive wiring Tx, and the detection wirings Rx1, Rx2, Rx3, Rx4.

FIG. 14B(b) schematically shows values of (Cap(M1)−Baseline(M1) obtained by subtracting the Baseline capacitance value (Baseline(M1)) from the capacitance value (Cap(M1) of the auxiliary wiring M1, and Cap(n,m)−Baseline(n,m) obtained by subtracting Baseline(n,m)) from the capacitance values (Cap(n,m)) measured from the predetermined drive wiring Tx at the coordinates (1,1), (1,2), . . . , (4,4) during the detection period. Referring to the drawing, the dashed line represents the Baseline capacitance values (Baseline(M1), Baseline(n,m)). In this way, the fringe field is blocked by the objects O1, O2 in the presence thereof. Therefore, the capacitance values (Cap(M1), Cap(n,m)) actually measured become smaller than the Baseline capacitance value (Baseline (M1), Baselines(n,m)).

FIG. 14B(c) schematically shows capacitance values (α(Cap(M1)−Baseline(M1)) obtained by multiplying the value (Cap(M1)−Baseline(M1)), that is, the value derived from subtracting the Baseline capacitance value (Baseline (M1)) of the auxiliary wiring M1 from the capacitance value (Cap(M1)) measured through the auxiliary wiring (monitor wiring) M1, by the coefficient α. The graph shows the influence of the object O2 with respect to the detection electrodes Rx1, Rx2, Rx3, Rx4 and the like on the auxiliary wiring (monitor wiring) M1.

FIG. 14B(d) schematically shows the value obtained by subtracting the capacitance value ($\alpha$(Cap(M1)−Baseline (M1))) as described referring to FIG. 14B(c) from the capacitance values (Cap(M1)−Baseline(M1), Cap(n,m)−Baseline(n,m)) as described referring to FIG. 14B(b), that is, the capacitance value under no influence of the object O2.

Referring to FIG. 6A, the explanation will be made on the assumption that the object O1 is in proximity to or contact with the detection electrode Rx, and the object O2 is in proximity to or contact with the auxiliary wiring M1 and the lead-out wiring W11. It is also assumed that the Baseline capacitance value of the detection electrode Rx (C0+C10+C3) has been changed to the capacitance value of C0+C10'+C3' under the influence of the objects O1, O2 on the fringe field, and the Baseline capacitance value C20 of the auxiliary wiring M1 has been changed to the capacitance value of C20' under the influence of the object O2 on the fringe field. In the above-described case, the auxiliary wiring M1 substantially parallel to the lead-out wiring W11 has similar length to that of the lead-out wiring W11. Therefore, each of those wirings has substantially equal parasitic capacitance. Accordingly, the C20 has substantially the same value as the C10 (C20≈C10), and the C20' has substantially the same value as the C10' (C20'≈C10'). The capacitance value equivalent to the change value C10'−C10 obtained relative to the change value C20'−C20 may be calculated through the formula of (C10'−C10)≈$\alpha$(C20'−C20)=$\alpha$(Cap(M1)−Baseline(M1)). Then the capacitance change value under the influence only of the object O1 while eliminating the influence of the object O2 may be calculated through the equation of (C0+C10'+C3')−(C0+C10+C3)−(C20'−C20)=(C3'−C3)+(C10'−C10)−(C20'−C20)=(C3'−C3)+(C10'−C10)−$\alpha$(Cap(M1)−Baseline(M1))=(C3'−C3). The explanation referring to FIG. 6A has been made based on the principle that the capacitance C3 between the object O1 and the detection electrode Rx, the capacitance C21 between the object O2 and the auxiliary wiring M1, and the capacitance C11 between the object O2 and the lead-out wiring W11 are added since the fringe field between the drive electrode Tx, and the detection electrode Rx, the auxiliary wiring M1, and the lead-out wiring W11 is blocked by the finger and the stylus pen, resulting in the similar consequence.

As a result, the signal change value and coordinates of the object O1 in the active region AA may be accurately obtained by eliminating the influence of noise generated from the object O2 around the frame region E1.

Figure 15:
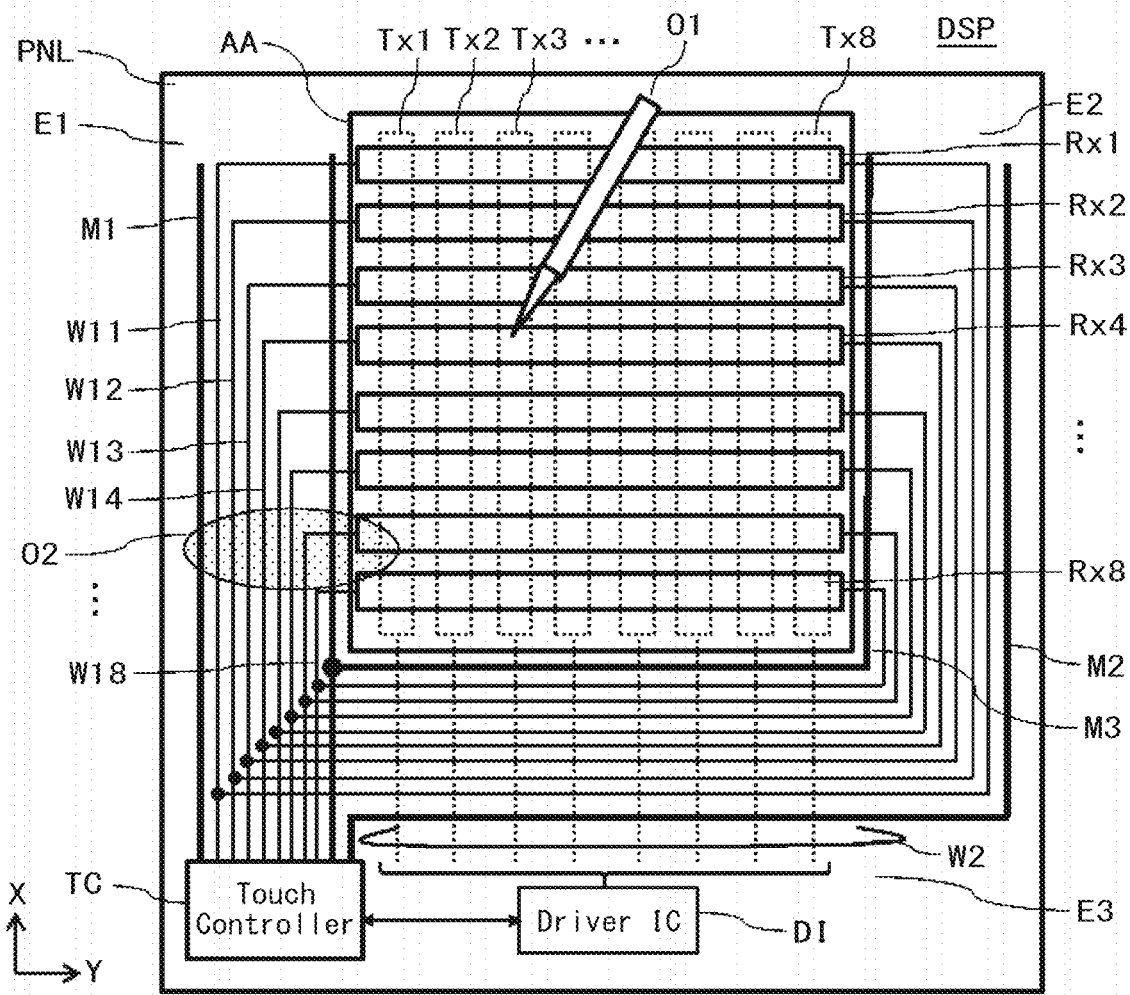
FIG. 15 is a plan view showing another exemplary structure of the sensor provided for the display device DSP with sensor according to the embodiment.

FIG. 15 is a plan view showing another exemplary structure of the sensor for the display device DSP with sensor according to the embodiment. The structure shown in FIG. 15 is different from the one as shown in FIG. 7 in that an auxiliary wiring (monitor wiring) M3 is added to the auxiliary wirings M1, M2. That is, three auxiliary wirings (monitor wirings) M1, M2, M3 are provided. The auxiliary wiring (monitor wiring) M3 is disposed between the outer side of the active region (touch detection region) AA of the sensor and the auxiliary wirings M1, M2 so as to dispose most part of the lead-out wirings W11, W12, . . . , M18 between the auxiliary wiring M3 and M1, M2. The other structure is the same as the one as shown in FIG. 7, and detailed explanation thereof, thus, will be omitted.

The above-described structure allows the auxiliary wirings M1, M2, M3 to detect existence of the object O2 around the frame regions E1, E2, E3. The coordinates of the touch position of the object O1 may be accurately obtained in reference to the detection information derived from the active region (touch detection region) AA of the sensor, and the detection information derived from the auxiliary wirings M1, M2, M3.

Figure 16A:
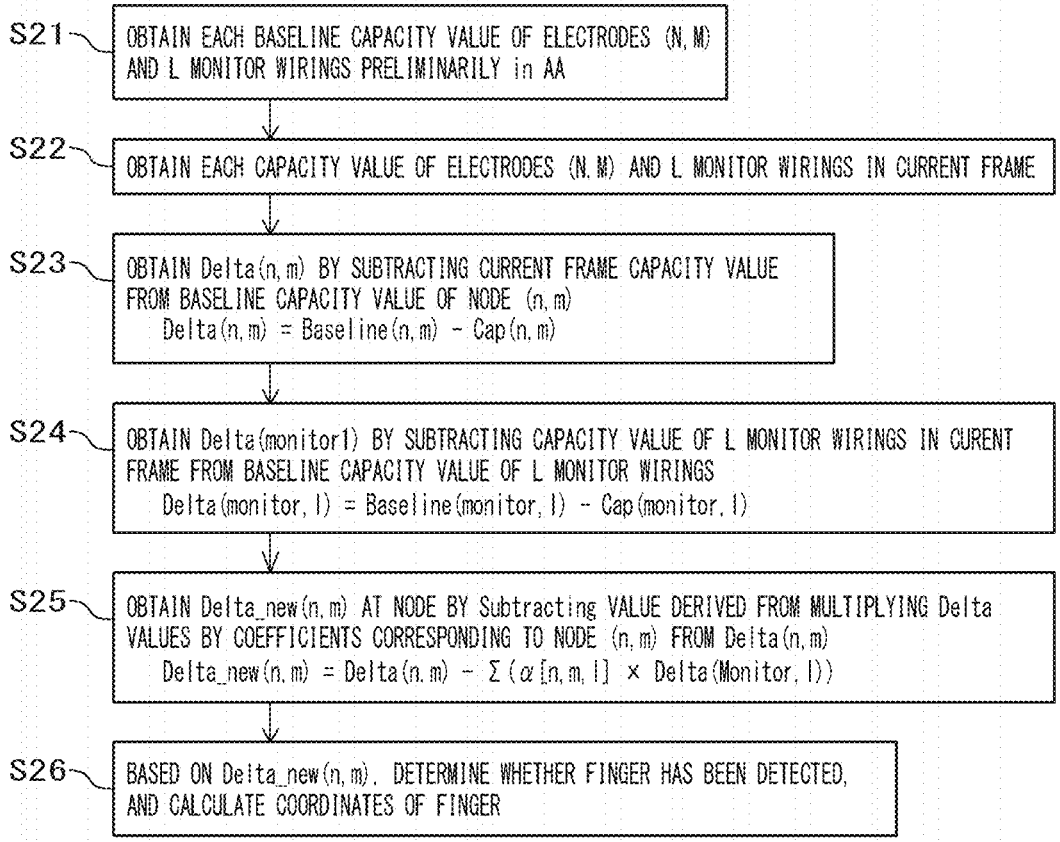
FIG. 16A represents a signal calculation algorithm for the display device DSP with sensor including a plurality of auxiliary wirings (monitor wirings)

FIG. 16A represents the signal calculation algorithm for the display device DSP with sensor including the plurality of auxiliary wirings (monitor wirings). The signal calculation algorithm as shown in FIG. 16A is designed to expand its function adaptable to L auxiliary wirings (monitor wirings) more than three auxiliary wirings (monitor wirings) M1, M2, M3 as shown in FIG. 15. In other words, the signal calculation algorithm is intended to be executed for the structure having N detection electrodes Rx, M drive electrodes Tx, and L auxiliary wirings (monitor wirings).

In step S21, the reference capacitance values (Baseline capacitance values) for N×M electrodes in the active region AA of the sensor, and L monitor wirings are preliminarily obtained. The Baseline capacitance value represents the one at the intersection between the nth detection electrode Rx and the mth drive electrode Tx, and those of L monitor wirings in the absence of the object O1 around the active region AA of the sensor. The term "n" is an integer from 1 to N, the "m" is an integer from 1 to M, and the "l" is an integer from 1 to L.

In step S22, measured and obtained are each capacitance value Cap(n,m) of electrodes (N×M) in the active region AA of the current frame through scanning of M drive electrodes Tx with the drive pulse Sig, and the capacitance values (Cap(monitor,1)) of L monitor wirings.

In step S23, the capacitance value Cap(n,m) at the node (n,m) of the current frame obtained in step S22 is subtracted from the Baseline capacitance value Baseline(n,m) at the node (n,m) obtained in step S21 to calculate a signal (first detection value) Delta(n,m). That is, the value of the signal Delta(n,m) is calculated by the following formula. The term "(n,m)" represents the intersection between the nth detection electrode Rx and the mth drive electrode Tx.

Delta($n,m$)=Baseline($n,m$)−Cap($n,m$)

In step S24, the capacitance value Cap(monitor,1) of L monitor wirings of the current frame obtained in step S22 is subtracted from the Baseline capacity value (Baseline(monitor,1)) of L monitor wirings obtained in step S21 to calculate the value Delta(monitor,1) equivalent to the signal change derived from L monitor wirings. That is, the signal change value (second detection value) Delta(monitor,1) is obtained by the following formula.

Delta(monitor,1)=Baseline(monitor,1)−Cap(monitor,1)

In step S25, the value obtained by multiplying the Delta (monitor,1) calculated in step S24 by the coefficient $\alpha$ in accordance with the node (n,m) is subtracted from the signal Delta value (Delta(n,m)) obtained in step S23 at the node to calculate the signal change value (Delta_new) at the node (n,m). In other words, the value equivalent to the signal change (third detection value) Delta_new is obtained by the following formula. The coefficient $\alpha$ is the preliminarily obtained value. It is possible to set the coefficient $\alpha$ to zero.

Delta_new($n,m$)=Delta($n,m$)−$\Sigma$($\alpha[n,m,l]$×Delta(monitor,1)

In step S26, based on the signal change value at the node (n,m), that is, Dleta_new(n,m) obtained in step S25, determination is made as to detection of the object O1, and its coordinates is calculated. The result is sent to the host processor. If the signal change value Delta_new(n,m) at the node (n,m) is larger than the predetermined value, it may be determined that the object (external proximity object) O1 has been in proximity to the active region (touch detection region) AA of the sensor. Identifying the node(n,m) at which the signal change value Delta_new(n,m) is larger than the predetermined value allows determination with respect to the coordinates of the touch position of the object O1.

The algorithm shown in FIG. 16A is executed at the respective nodes(n,m).

Figure 16B:
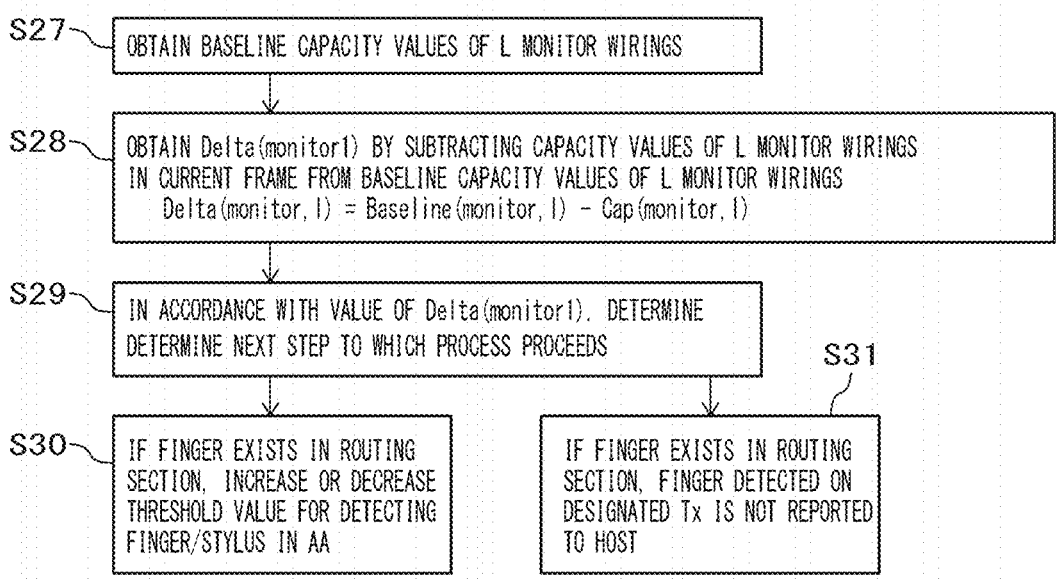
FIG. 16B is an explanatory diagram of the processing algorithm to be executed in the presence of an object O2 around a peripheral region.

In the above-described way, existence of the object O2 around the frame region may be detected through the auxiliary wirings. The coordinates of the touch position of the object O1 may be correctly obtained in reference to the detection information with respect to the active region (touch detection region) of the sensor, and the detection information derived from the auxiliary wirings. FIG. 16B is an explanatory diagram of the processing algorithm executed in the presence of the object O2 around the peripheral region (frame region). The processing algorithm as shown in FIG. 16B is designed to expand its function adaptable to L auxiliary wirings (monitor wirings) more than three auxiliary wirings (monitor wirings) M1, M2, M3 as shown in FIG. 15. In other words, the processing algorithm is intended to be executed for the structure having N drive electrodes Tx, M detection electrodes Rx, and L auxiliary wirings (monitor wirings). The term "1" represents an integer from 1 to L.

In step S27, the Baseline capacitance value of L auxiliary wirings (monitor wirings) is obtained.

In step S28, the capacitance value of L monitor wirings of the current frame is subtracted from the Baseline capacitance value of L monitor wirings to calculate the signal change value Delta(monitor,1). That is, the signal change value Delta(monitor,1) is calculated by the following formula.

Delta(monitor,1)=Baseline(monitor,1)−Cap(monitor,1)

In step S29, the subsequent step to be executed in either step S30 or S31 is determined in accordance with the signal change values Delta(monitor,1).

If the process proceeds to step S30 where the presence of the object (O2) around the frame region (E1 or E2) is determined based on the signal change value Delta(monitor,1), the required processing will be executed, for example, by increasing or decreasing the threshold value for detecting the object O1, for example, finger or the stylus pen in the active region AA.

If the process proceeds to step S31 where the presence of the object (O2) around the frame region (E1 or E2) is determined, the required processing will be executed, for example, by refraining report on the object O2 detected around the designated drive wiring Tx to the host processor (Host).

The use of the processing algorithm as described above allows execution of the signal processing in the presence of the object O2 around the frame regions (E1 or E2) as desired.

FIG. 17 is a plan view showing another exemplary structure of the sensor for the display device DSP with sensor according to the embodiment. The structure as shown in FIG. 17 is different from the one as shown in FIG. 7 in that the frame region E1 includes the lead-out wirings, for example, W11, W13, W15, W17, which are connected to the odd-numbered detection electrodes Rx1, Rx3, Rx5, Rx7. The frame region E2 includes the lead-out wirings, for example, W12, W14, W16, W18, which are connected to the even-numbered detection electrodes Rx2, Rx4, Rx6, Rx8. The other structure is the same as the one as shown in FIG. 7, and detailed explanation thereof, thus, will be omitted.

The above-described structure allows detection of existence of the object O2 around the frame regions E1, E2, E3 through the auxiliary wirings M1, M2. The coordinates of the touch position of the object O1 may be correctly obtained in reference to the detection information derived from the active region (touch detection region) AA of the sensor, and the detection information through the auxiliary wirings M1, M2.

Figure 18:
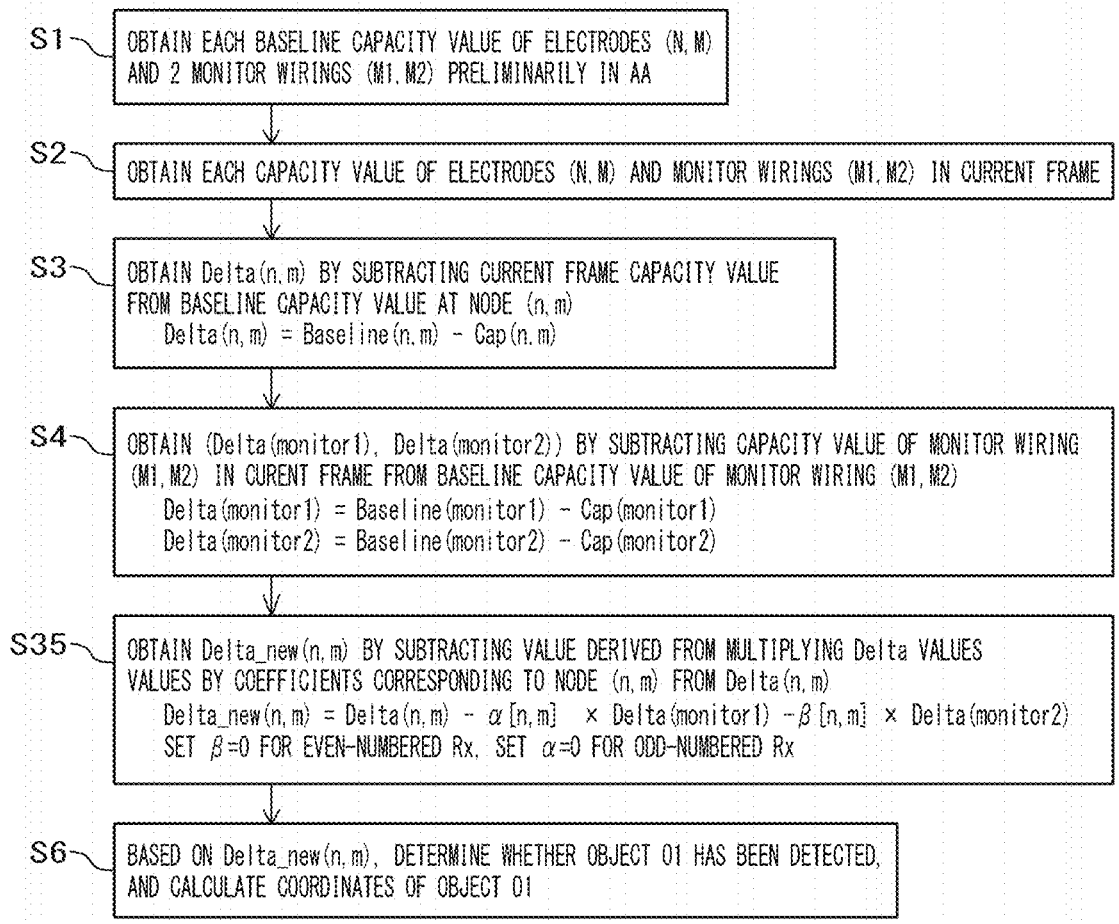
FIG. 18 represents the signal calculation algorithm for the display device DSP with sensor as shown in FIG. 17.

FIG. 18 represents the signal calculation algorithm for the display device DSP with sensor as shown in FIG. 17. Steps S1, S2, S3, S4, S6 of the algorithm shown in FIG. 18 are the same as those S1, S2, S3, S4, S6 as shown in FIG. 8. The step S5 shown in FIG. 8 has been changed to the step S35 as shown in FIG. 18. That is, in step S35, the coefficient β is set to 0 (β=0) for the even-numbered detection electrodes Rx (Rx2, Rx4, Rx6, Rx8), and the coefficient α is set to 0 (α=0) for the odd-numbered detection electrodes Rx (Rx1, Rx3, Rx5, Rx7) for calculation by the following formula.

Delta(n,m)=Delta(n,m)−α[n,m]×Delta(monitor1)−β[n,m]×Delta(monitor2)

Figure 19:
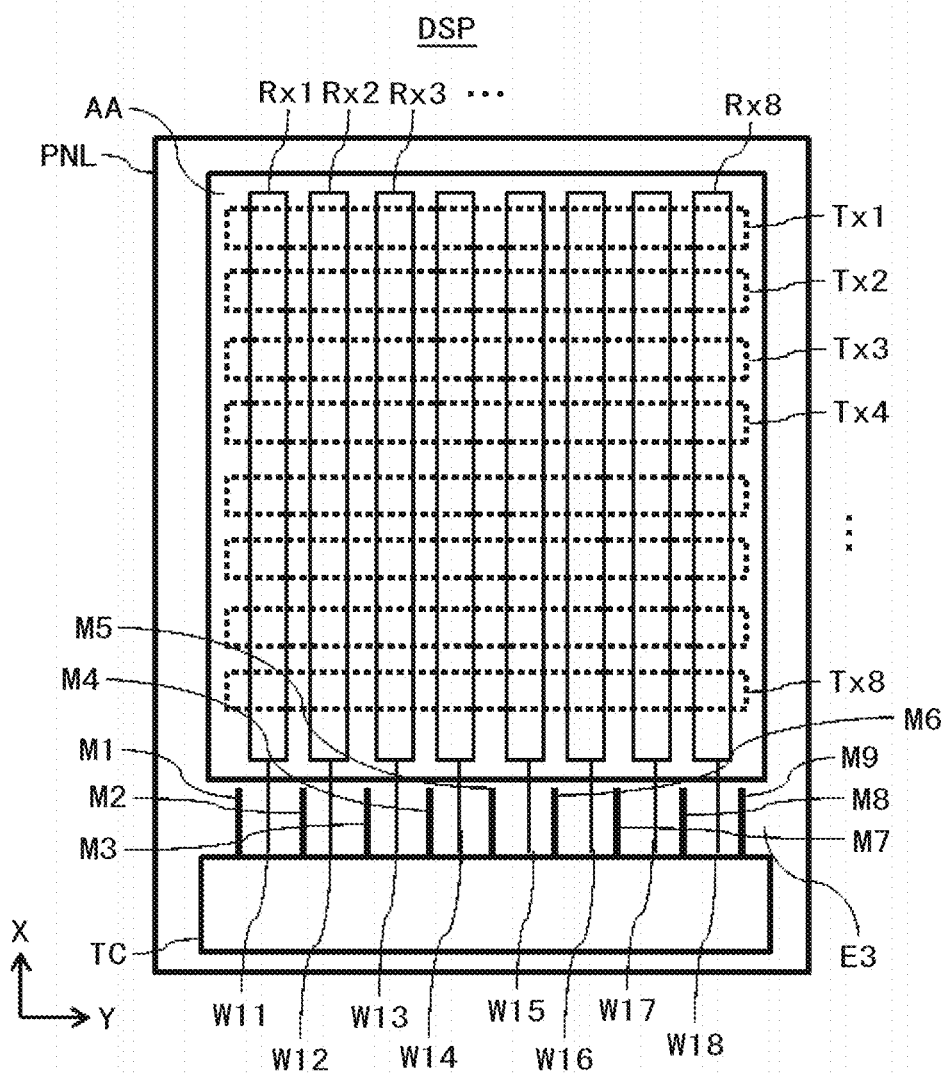
FIG. 19 is a plan view showing another exemplary structure of the sensor provided for the display device DSP with sensor according to the embodiment.

FIG. 19 is a plan view showing another exemplary structure of the sensor for the display device DSP with sensor according to the embodiment. The structure shown in FIG. 19 is different from the one as shown in FIG. 5 in that the drive electrodes Tx1, Tx2, Tx3, . . . , Tx8 extending in Y direction in the stripe arrangement are disposed and driven through a plurality of wirings (not shown) on the frame regions E1, E2, and the detection electrodes Rx1, Rx2, Rx3, . . . , Rx8 extending in the X direction in the stripe arrangement are disposed. The lead-out windings W11, W12, . . . , W18 extending in the X direction are also disposed. The auxiliary wirings (monitor wirings) M1, M2, . . . , M9 are arranged while extending in the X direction, adjacent wirings of which interpose the lead-out wirings W11, W12, . . . , W18 therebetween, respectively. In the above-described case, as for the auxiliary wirings (monitor wirings) M1, M2, . . . , M9, for correcting the detection values of the respective lead-out wirings W11, W12, . . . , W18, at least one of adjacent auxiliary wirings interposing the lead-out wiring may be used for such correction. The drawing shows the part defined by the detection electrodes and the auxiliary wirings (monitor wirings) in the form of straight lines for easy understanding. However, the part may be defined in the form of the bent line.

In this case, the signal calculation algorithm as shown in FIG. 16A is usable.

This makes it possible to detect existence of the object O2 through the auxiliary wirings M1, M2, . . . , M8 around the frame region E3. In the above-described way, the coordinates of the touch position of the object O1 may be correctly obtained using the detection information from the active region (touch detection region) AA of the sensor, and the detection information derived from the auxiliary wirings M1, M2.

Figure 20:
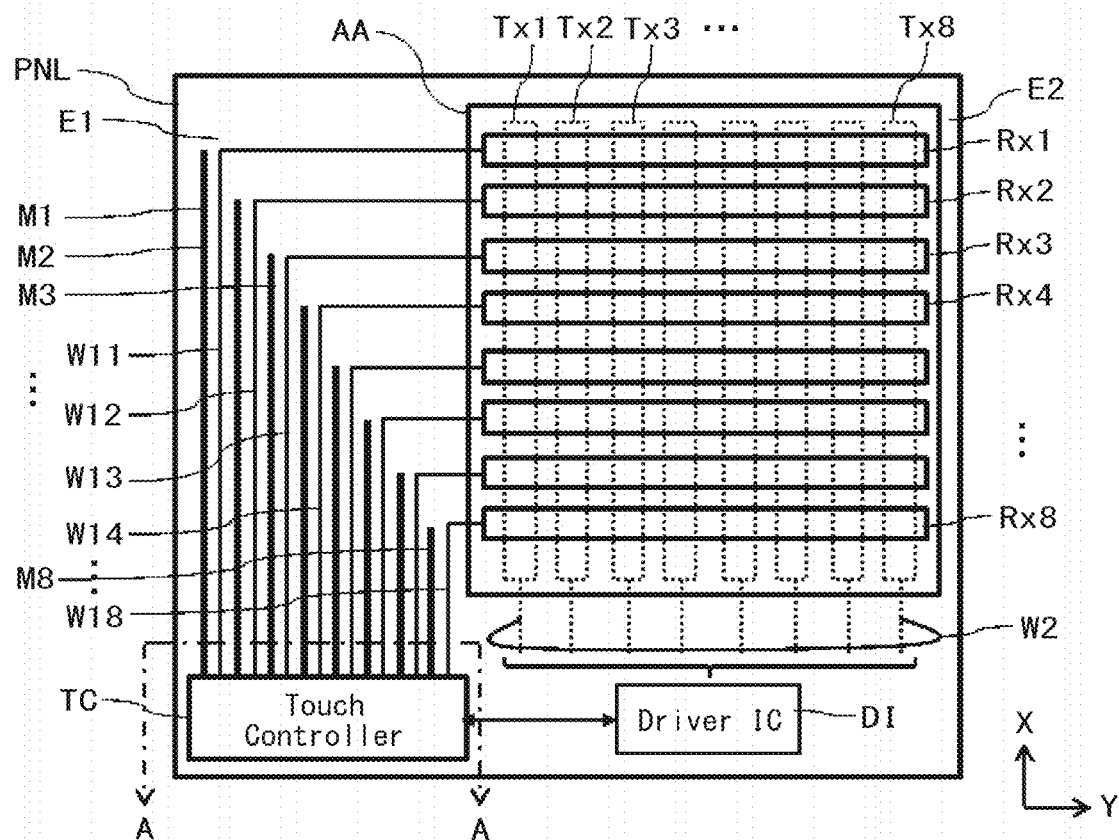
FIG. 20 is a plan view showing another exemplary structure of the sensor provided for the display device DSP with sensor according to the embodiment.

FIG. 20 is a plan view showing another exemplary structure of the sensor for the display device DSP with sensor according to the embodiment. The structure shown in FIG. 20 is different from the one as shown in FIG. 5 in that the same number of the auxiliary wirings (monitor wirings) M1, M2, M3, . . . , M8 as that of the detection electrodes Rx1, Rx2, Rx3, . . . , Rx8 are arranged parallel to the arrangement direction of the detection electrodes Rx1, Rx2, Rx3, . . . , Rx8. The length of each of the auxiliary wirings (monitor wirings) M1, M2, M3, . . . , M8 is substantially same as that of each of the corresponding lead-out wirings W11, W12, W13, . . . , W18. The drawing shows the part defined by the detection electrodes and the auxiliary wirings (monitor wirings) in the form of straight lines for easy understanding. However, the part may be defined in the form of the bent line.

Referring to FIG. 20, the auxiliary wiring (monitor wiring) M1 is disposed between the left side of the display panel PNL and the lead-out wiring W11. That is, the auxiliary wiring (monitor wiring) M1 is disposed at the outer side of the lead-out wiring W11. Likewise, each of the auxiliary wirings (monitor wirings) M2, M3, . . . , M8 is disposed at the outer side of each of the lead-out wirings W12, W13, . . . , W18 in the nonrestrictive manner. It is also possible to dispose the lead-out wiring W11 between the left side of the display panel PNL and the auxiliary wiring (monitor wiring) M1. In other words, it is possible to dispose the auxiliary wiring (monitor wiring) M1 at the inner side of the lead-out wiring W11 (at the side of the active region (touch detection region) AA of the sensor). Likewise, it is possible to dispose each of the auxiliary wirings (monitor wirings) M2, M3, . . . , M8 at the inner sides of each of the lead-out wirings W12, W13, . . . , W18, respectively. FIG. 20 shows the same number of the auxiliary wirings (monitor wirings) M1, M2, . . . , M8 as that of the detection electrodes Rx1, Rx2, Rx3, . . . , Rx8 in the stripe arrangement. However, the number of the detection electrode may be different from that of the auxiliary wirings (monitor wirings). For example, it is possible to eliminate arbitrary number of the auxiliary wirings (monitor wirings) such as M2, M4 from those (monitor wirings) M1, M2, . . . , M8. That is, the desired number of auxiliary wirings (monitor wirings) may be eliminated from the structure.

Figure 21A:
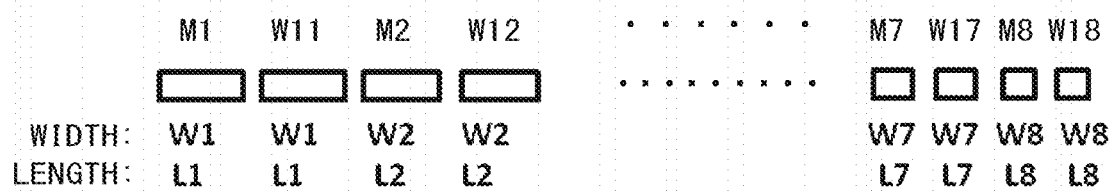
FIG. 21A is a conceptual sectional diagram of a lead-out wirings and the auxiliary wirings taken along line A-A of FIG. 20.

The signal calculation algorithm as shown in FIG. 16A is usable for the above-structured display device DSP with sensor as shown in FIG. 20. In this case, the same number of the auxiliary wirings (monitor wirings) M1, M2, . . . , M8 as that of the detection electrodes Rx1, Rx2, Rx3, . . . , Rx8 are disposed. The term "1" represents the integer from 1 to N. FIG. 21A is a conceptual sectional diagram of the lead-out wirings and auxiliary wirings (monitor wirings) along the line A-A of FIG. 20. Assuming that the width and the length of the auxiliary wiring (monitor wiring) M1 are set to W1 and L1, the width and the length of the lead-out wiring W11 are set to W1, L1. That is, the wiring is arranged so that values of the parasitic resistance and the parasitic capacitance of the auxiliary wiring (monitor wiring) M1 become substantially the same as those of the lead-out wiring W11. Assuming that the width and the length of the auxiliary wiring (monitor wiring) M2 are set to W2, L2, the width and the length of the lead-out wiring W12 are set to W2, L2 in the similar way. In the above-described case, relationships of W1>W2 and L1>L2 are established. Based on the similar principle, if the width and the length of the auxiliary wiring (monitor wiring) M7 are set to W7, L7, the width and the length of the lead-out wiring W17 are set to W7, L7. If the width and the length of the auxiliary wiring (monitor wiring) M8 are set to W8, L8, the width and the length of the lead-out wiring W18 are set to W8, L8. In the above-described case, relationships of W1>W2> . . . >W7>W8, and L1>L2> . . . >L7>S8 are established.

This makes it possible to configure the lead-out wirings and the auxiliary wirings (monitor wirings) while eliminating the influence of the parasitic resistance and the parasitic capacitance of the wiring as much as possible upon signal calculation.

FIG. 21B is a conceptual explanatory view of the detection value through the auxiliary wirings of the display device DSP with sensor as shown in FIG. 20. Referring to FIG. 21B, the y-axis represents the capacitance value (C) of the signal change Delta, and the x-axis (Rx) represents the order of the detection electrodes Rx1, Rx2, and Rx3. The drawing shows an example of capacitance values of the signal change Delta of the drive electrode Tx1, the detection electrodes Rx1, Rx2, Rx3, and the auxiliary wirings M1, M2, M3 in the presence of the object around the frame region E1. The Baseline capacitance values of the auxiliary wirings M1, M2, M3 are set to BM1, BM2, BM3. The capacitance values derived from the detection values (actual measurement values) of the Tx1, Rx1, Rx2, Rx3 and the like are set to C111, C112, C113, C114 and the like. In the case of L auxiliary wirings, the coefficient α is specified as the wiring coefficient α[n,m,l] so that the coefficient α for the auxiliary wiring M1 is set to α111, α121, α131, and the like, and the coefficient α for the auxiliary wiring M2 is set to α112, α122, α132 and the like. The coefficient α for the auxiliary wiring M3 is set to α113, α123, α133, and the like.

The line a of the graph represents the capacitance values (C) of the signal change Delta obtained by subtracting the capacitance value (C111, C112, C113, C114, and the like) derived from the detection value (actual measurement value) of the touch detection circuit from the Baseline capacitance value (B11, B12, B13, B14, and the like) between the Tx1 and the Rx1, Rx2, Rx3, and the like.

The line b of the graph represents the values (capacitance value (C) of signal change Delta) obtained by multiplying the value derived from subtracting the detection value (CM1) through the auxiliary wiring M1 from the Baseline capacitance value (BM1) of the auxiliary wiring M1 by the coefficient α (α111, α121, α131 and the like) of the auxiliary wiring M1.

The line c of the graph represents values (capacitance values (C) of signal change Delta) obtained by multiplying the value derived from subtracting the detection value (CM2) of the auxiliary wiring M2 from the Baseline capacitance value (BM2) of the auxiliary wiring M2 by the coefficient α (α112, α122, α132 and the like) of the auxiliary wiring M2.

The line d of the graph represents values (capacitance values (C) of signal change Delta) obtained by multiplying the value derived from subtracting the detection value (CM3) of the auxiliary wiring M3 from the Baseline capacitance value (BM3) of the auxiliary wiring M3 by the coefficient α (α113, α123, α133 and the like) of the auxiliary wiring M3.

The coefficient α of the auxiliary wiring M1 is set to α111=0.5, α121=0.2, α131=0.1. The coefficient α of the auxiliary wiring M2 is set to α112=0.4, α122=0.15, α132=0.1. The coefficient α of the auxiliary wiring M3 is set to α113=0.3, α123=0.1, α133=0.05. The node apart from the location of the auxiliary wiring, for example, the node with respect to the drive electrode Tx8 is hardly influenced by the auxiliary wiring. It is therefore possible to set the coefficient α to zero.

Figure 22:
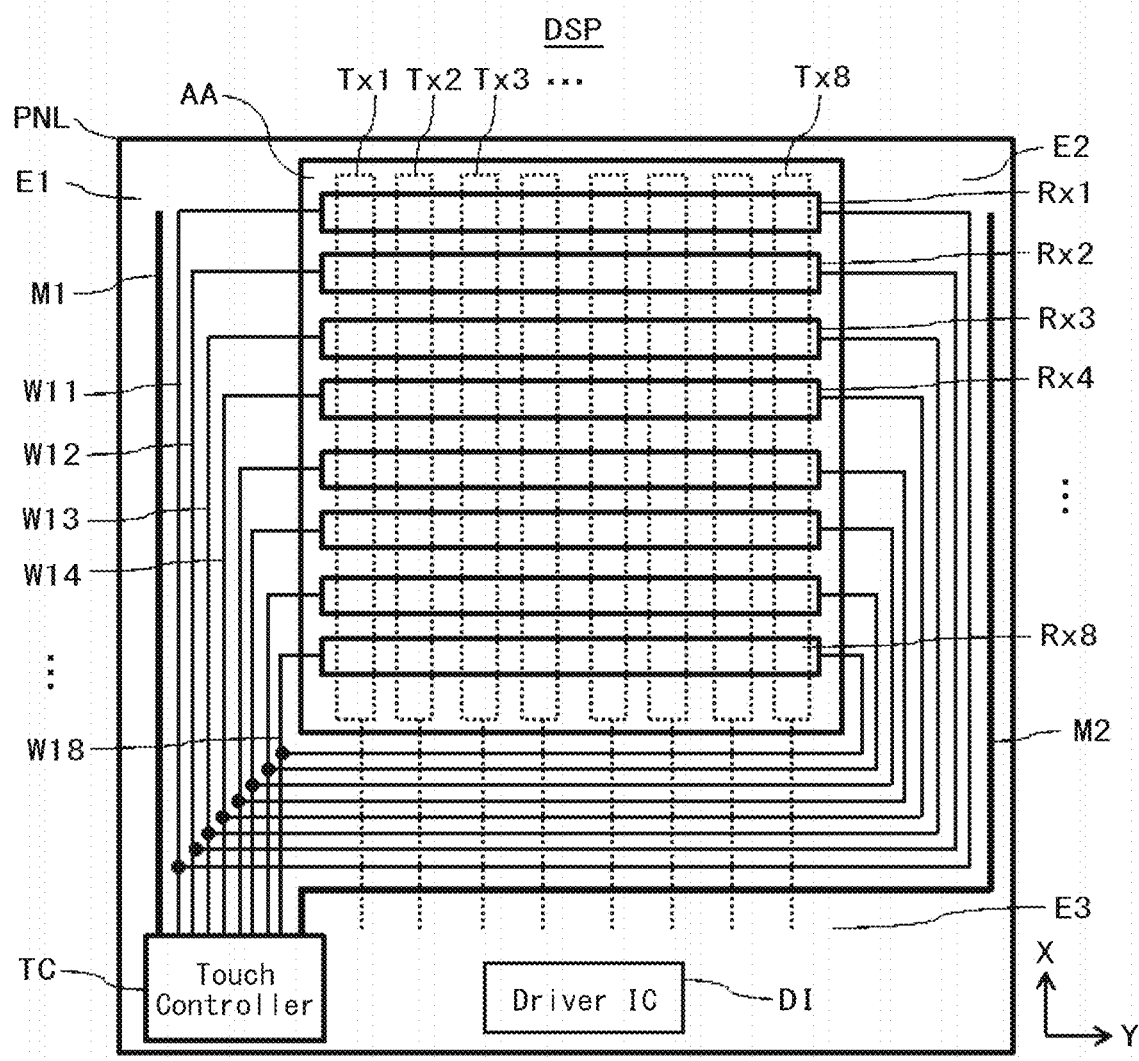
FIG. 22 is a plan view showing another exemplary structure of the sensor provided for the display device DSP with sensor according to the embodiment.

FIG. 22 is a plan view showing another exemplary structure of the sensor for the display device DSP with sensor according to the embodiment. The structure as shown in FIG. 22 is available for the self detection mode, and structurally similar to the one as shown in FIG. 7 except that the drive wirings Tx1, Tx2, . . . , Tx8 are not scanned by the display controller DI. Other structure is the same as the one as shown in FIG. 7, and detailed explanation thereof, thus will be omitted.

Figure 23:
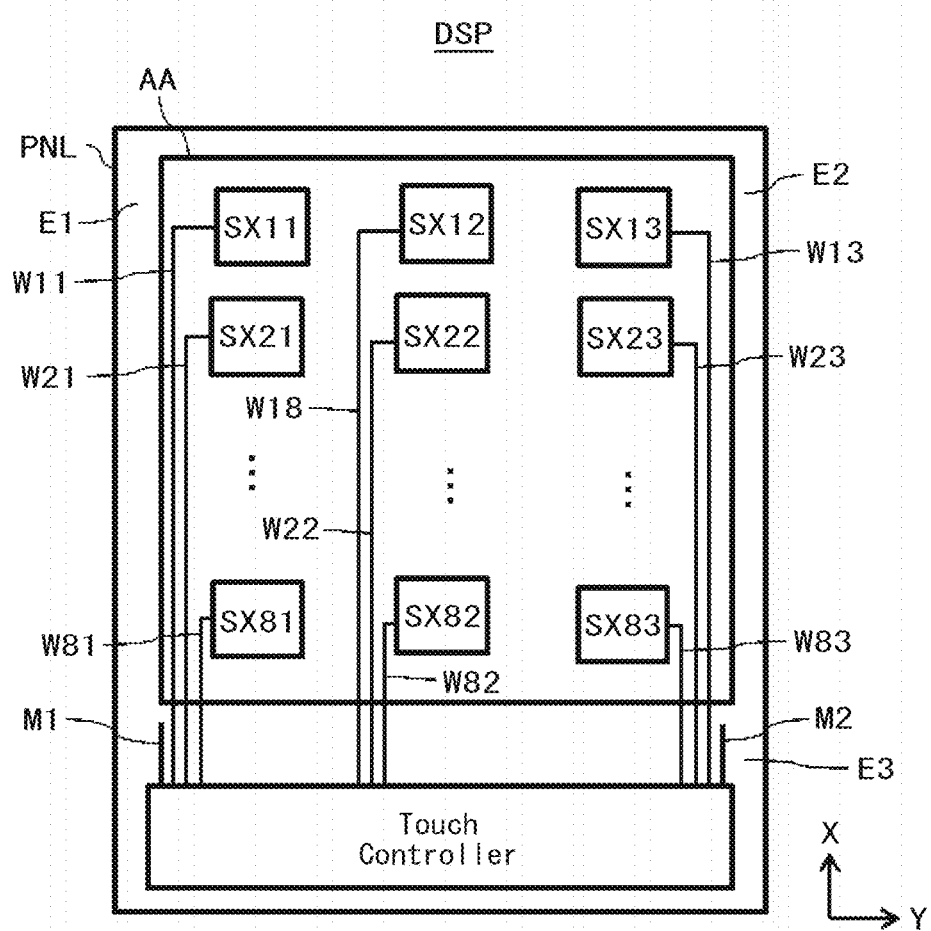
FIG. 23 is a plan view showing another exemplary structure of the sensor provided for the display device DSP with sensor according to the embodiment.

FIG. 23 is a plan view showing another exemplary structure of the sensor for the display device DSP with sensor according to the embodiment. The structure as shown in FIG. 23 is available for the self detection mode, and may be configured as the individual electrode having detection electrodes SX11, SX12, SX13, SX21, SX22, SX23, . . . , SX81, SX82, SX83 arranged in a matrix on the active region (touch detection region) AA of the sensor. In this case, it is possible to take detection signals from the respective individual electrodes of the SX11, SX12, SX13, SX21, SX22, SX23, . . . , SX81, SX82, SX83 through the lead-out wirings W11, W12, W13, W21, W22, W23, . . . , W81, W82, W83 so as to immediately locate the touch position. The auxiliary wiring (monitor wiring) M1 is disposed between the outer side of the lead-out wiring W11, that is, the left side of the display panel PNL and the lead-out wiring W11. The auxiliary wiring (monitor wiring) M2 is disposed between the outer side of the lead-out wiring W13, that is, the right side of the display panel PNL and the lead-out wiring 13.

It is possible to detect existence of the object O2 around the frame region E3 through the auxiliary wirings M1, M2.

Figure 24:
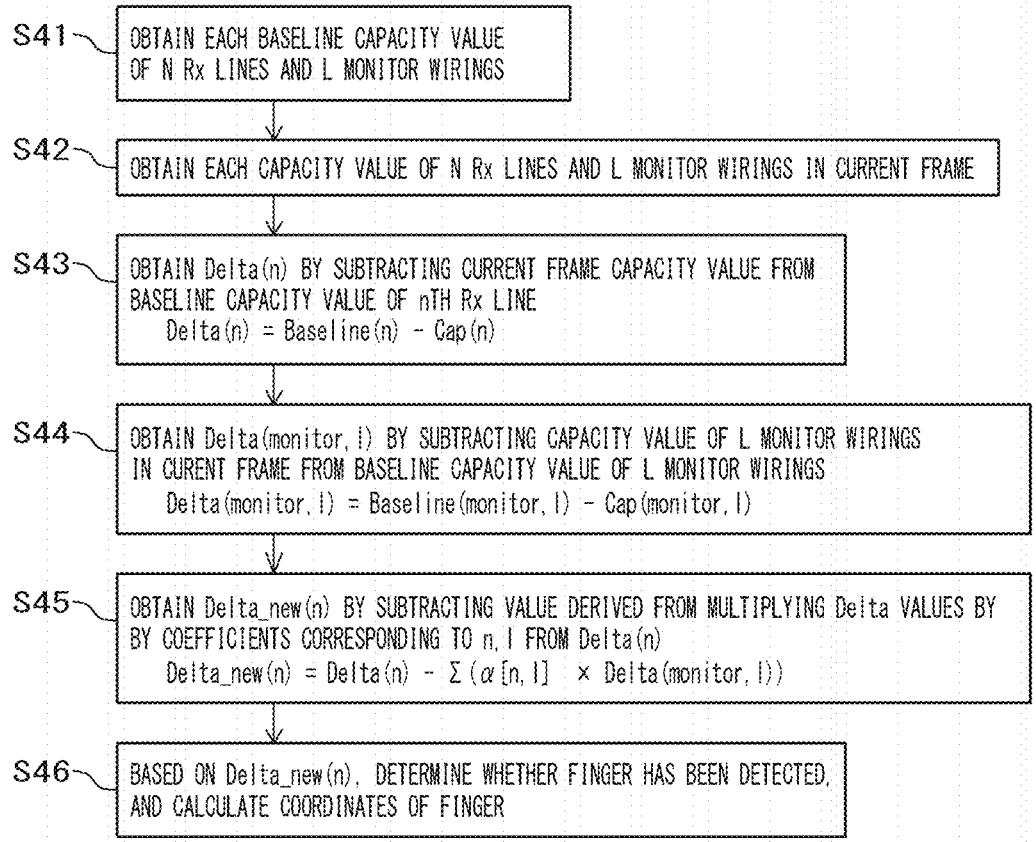
FIG. 24 represents a signal calculation algorithm for the display device DSP with sensor including a plurality of auxiliary wirings.

FIG. 24 represents the signal calculation algorithm for the display device DSP with sensor with sensor having a plurality of auxiliary wirings (monitor wirings). Referring to FIG. 24, the signal calculation algorithm in the self detection mode for the display device DSP with sensor as shown in FIGS. 22 and 23 will be described. The number of the auxiliary wirings (monitor wirings) may be expanded to L without being limited to two (M1, M2). With the signal calculation algorithm as shown in FIG. 24, the number of the detection electrodes corresponds to the number of the detection electrodes Rx as shown in FIG. 22, and corresponds to the number of the detection electrodes SX as shown in FIG. 23.

In step S41, N detection electrodes (corresponding to Rx or SX) in the active region AA of the sensor, and the reference wiring capacitance value (Baseline capacitance value) of L monitor wirings are preliminarily obtained. The Baseline capacitance value refers to the capacitance value of the nth detection electrode (Rx or SX), and the capacitance value of L monitor wirings. In this case, the "n" represents the integer from 1 to N, and "l" represents the integer from 1 to L.

In step S42, the process measures and obtains capacitance values (Cap(n)) of N detection electrodes (Rx or SX) of the current frame derived from scanning of each of N drive electrodes Rx (SX) one by one with the self detection drive pulse Sig1, and capacitance values Cap(monitor,1) of the L monitor wirings.

In step S43, the capacitance value Cap(n) at the nth node of the current frame obtained in step S42 is subtracted from the Baseline capacitance value Baseline(n) at the nth node obtained in step S41 so as to calculate the signal (first detection value) Delta(n) at the nth node. That is, the value of the signal Delta(n) is calculated by the following formula. The term (n) represents the capacitance value of the nth detection electrode Rx (or SX).

$$\text{Delta}(n) = \text{Baseline}(n) - \text{Cap}(n)$$

In step S44, the capacitance value Cap(monitor,1) of L monitor wirings of the current frame obtained in step S42 is subtracted from the Baseline capacitance value (Baseline(monitor,1)) of L monitor wirings obtained in step S41 so as to calculate the signal change value (second detection value) Delta(monitor,1) through L monitor wirings.

$$\text{Delta}(\text{monitor},1) = \text{Baseline}(\text{monitor},1) - \text{Cap}(\text{monitor},1)$$

In step S45, the value derived from multiplying the Delta(monitor,1) obtained in step S44 by the coefficient α corresponding to n is subtracted from the Delta value Delta(n) obtained in step S43 at each node so as to calculate the signal change value (Delta_new) at the nth node. That is, the signal change value (third detection value) Delta_new is obtained by the following formula. The coefficient α as the predetermined coefficient can be set to zero.

$$\text{Delta\_new}(n) = \text{Delta}(n) - \Sigma(\alpha[n,1] \times \text{Delta}(\text{monitor},1))$$

In step S46, determination with respect to detection of the object O1 is made, and the coordinate value of the object O1 is calculated based on the signal change value Delta_new(n) at the nth node obtained in step S45. The obtained information is sent to the host processor (Host).

In the self detection mode for the display device DSP with sensor as shown in FIGS. 22, 23, the processing algorithm shown in FIG. 16B, or the calculation as represented by FIG. 6B may be employed for the processing algorithm in the presence of the object O2 around the frame region.

Figure 25:
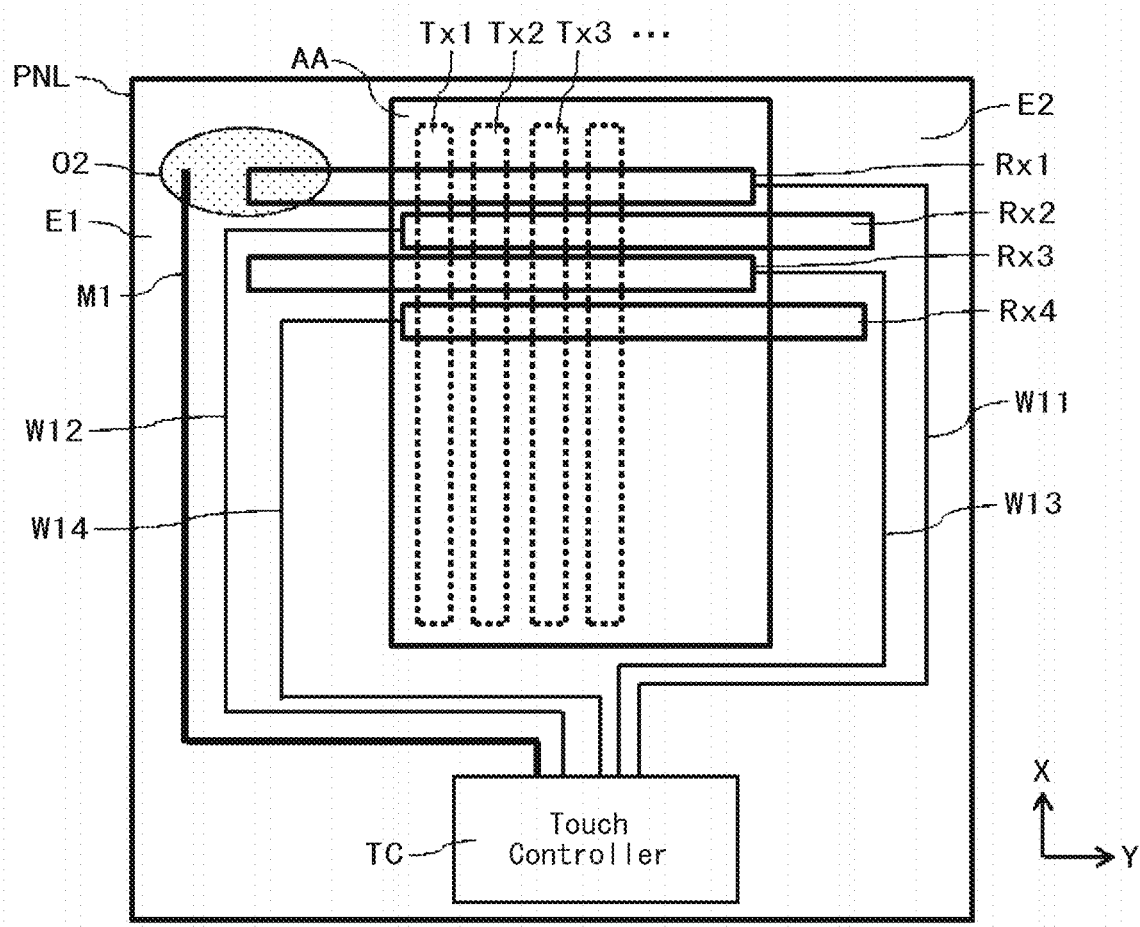
FIG. 25 is a plan view showing another exemplary structure of the sensor provided for the display device DSP with sensor according to the embodiment.

FIG. 25 is a plan view showing another exemplary structure of the sensor for the display device DSP with sensor according to the embodiment. The detection electrodes Rx1, Rx2, Rx3, Rx4 and the like in the stripe arrangement each extending in Y direction are disposed, and the drive wirings Tx1, Tx2, Tx3 and the like in the stripe arrangement each extending in X direction are disposed on the active region (touch detection region) AA of the sensor. The detection electrodes extend to reach the frame regions E1, E2. In other words, the detection electrodes Rx1 and Rx3 extend to reach the frame region E1 (outside of active region AA), and the detection electrodes Rx2 and Rx4 extend to reach the frame region E2 (outside of active region AA). The lead-out wirings W11, W13 from the detection electrodes Rx1, Rx3 are disposed on the frame region E2, and connected to the touch controller TC. The lead-out wirings W12, W14 from the detection electrodes Rx2, Rx4 are disposed on the frame region E1, and connected to the touch controller TC. In this case, the auxiliary wiring (monitor wiring) M1 is disposed between the left side of the display panel PNL and the lead-out wiring W12 and the respective ends of the detection wirings Rx1 and Rx3, and further extends parallel to the outermost wiring W12 in the X direction.

With the above-described structure, it is possible to detect the coordinates of the object O2 in contact with the frame region E1 through self detection of the detection electrodes Rx1, Rx2, . . . , and the auxiliary wiring M1. FIG. 25 shows the auxiliary wiring disposed at the side of the frame region E1. The auxiliary wiring may also be disposed on the frame region E2. Alternatively, both the auxiliary wirings M1 and M2 may be disposed on both frame regions E1 and E2, respectively.

Figure 26:
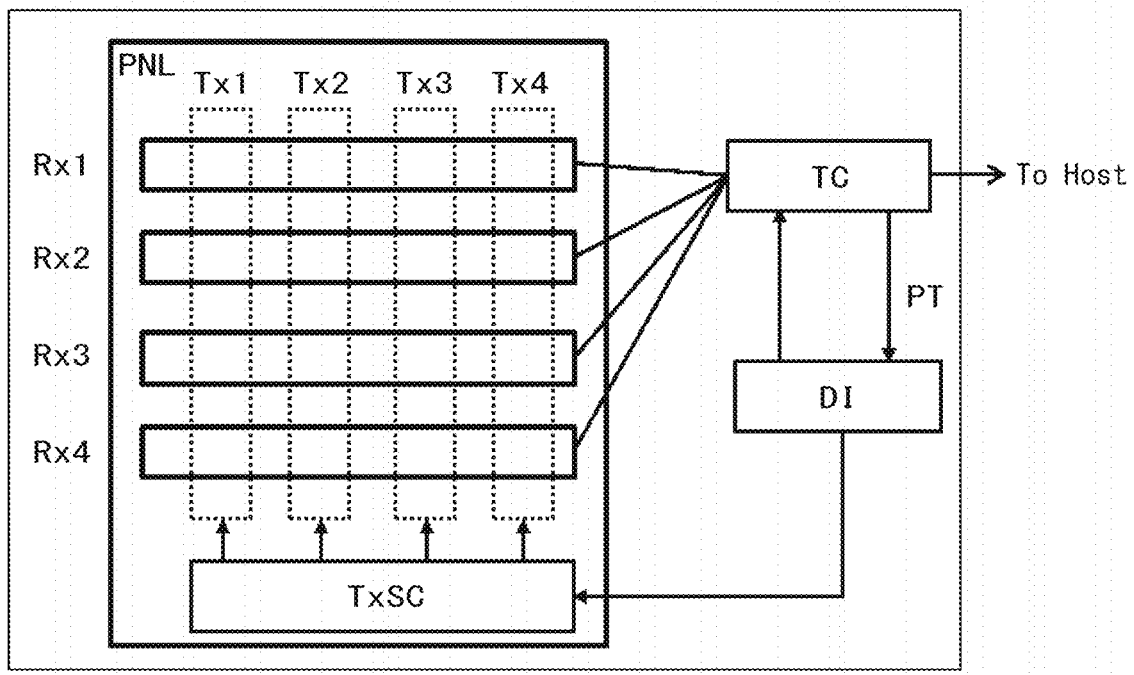
FIG. 26 is a schematic block diagram of the display device DSP with sensor according to the embodiment.

FIG. 26 is a block diagram of the display device DSP with sensor according to the embodiment. The drawing simply shows the inner structure of the display panel PNL for avoiding complexity, that is, showing four detection electrodes Rx (Rx1, Rx2, Rx3, Rx4), and four drive electrodes Tx (Tx1, Tx2, Tx3, Tx4).

The display device DSP with sensor includes the display panel PNL, the touch controller (touch detection circuit, control circuit) TC, and the display controller DI.

The display panel PNL includes the detection electrodes Rx, the drive electrodes Tx intersecting the detection electrodes Rx, and a Tx line scanning circuit TxSC connected to the drive electrodes Tx (Tx1, Tx2, Tx3, Tx4) so as to be driven sequentially with the drive pulse Sig.

The touch controller TC is connected to the detection electrodes Rx1, Rx2, Rx3, Rx4 in the display panel PNL via the respective lead-out lines (not shown) so as to receive signals from the detection electrodes Rx1, Rx2, Rx3, Rx4. Upon reception of the signal from the detection electrode Rx during the touch detection period, the touch controller TC executes the signal calculation algorithm or the processing algorithm as shown in FIGS. 8, 9, 16A, 16B, 18, and 24 is executed to send such information as the detection coordinates to the host processor (Host). The touch controller TC generates and outputs the drive signal PT to the display controller DI for notifying the touch detection period.

The display controller DI serves to write display data to the display pixel in the display panel PNL, and to read the display data from the display pixel as well as supply voltage and control timing to the Tx line scanning circuit TxSC for generating the drive pulse Sig during the touch detection period. The display controller DI generates synchronous signals for notifying the drive pulse Sig application timing during touch detection period, and outputs the signals to the touch controller TC.

Referring to FIG. 26, the communication with the host is controlled by the touch controller TC. However, the display controller DI may be configured to communicate with the host so as to control the touch controller TC.

Figure 27:
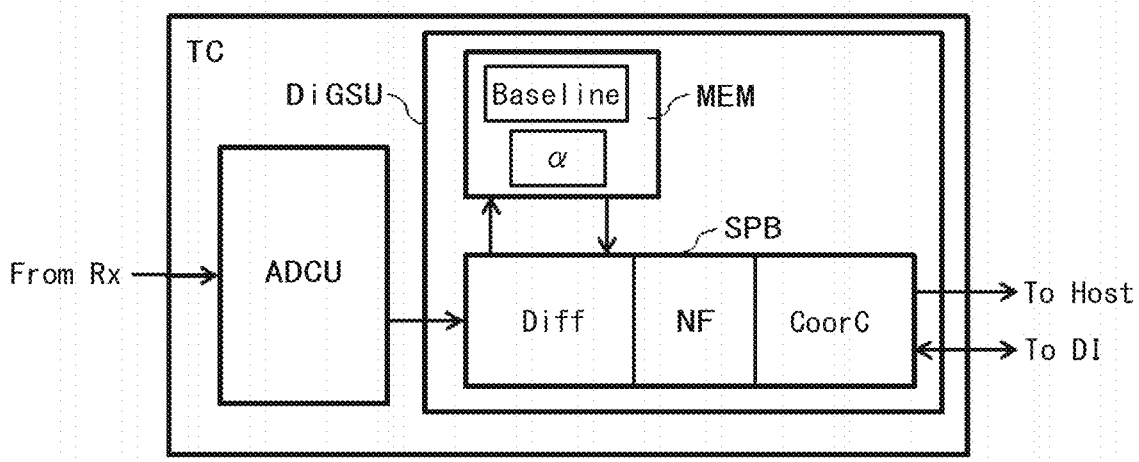
FIG. 27 is a schematic block diagram of a touch controller TC according to the embodiment.

FIG. 27 is an explanatory block diagram of the touch controller TC according to the embodiment. The touch controller TC includes an analog-digital converter ADCU, and a digital signal processing unit DiGSU.

The analog-digital converter ADCU includes an analog-digital conversion circuit for converting the analog detection signal from the detection electrode Rx into the digital signal. In the case of the analog detection signal formed as the current signal with positive pole and negative pole, the circuit is configured to detect such analog detection signal as the current signal. In this case, the analog-digital converter ADCU includes a current-voltage conversion circuit for converting the analog detection signal into the voltage signal, a signal polarity inversion circuit for inverting the polarity of the negative polarity signal from the current-voltage conversion circuit into the positive polarity signal, an averaging circuit for averaging the output signal of the signal polarity inversion circuit, and an analog-digital conversion circuit for converting the analog voltage output signal from the averaging circuit into the digital signal.

The digital signal processing unit DiGSU includes a signal processing unit SPB and a memory unit MEM. The signal processing unit SPB includes a differential arithmetic circuit Diff, a noise filtering circuit NF, and a coordinate arithmetic circuit CoorC. The signal processing unit SPB executes the signal calculation algorithm as shown in FIG. 16A, or the processing algorithm as shown in FIG. 16B. The signal processing unit SPB determines as to existence of the object O2 around the peripheral region (frame region) of the active region (touch detection region) AA of the sensor.

The memory unit MEM stores control data table such as the Baseline capacitance values and the coefficient α, control data, and control program required for touch detection processing. For example, the volatile memory such as the static random access memory (SRAM), or the nonvolatile memory such as the flash memory may be employed for the memory unit MEM. It is preferable to store the Baseline capacitance values in the volatile memory to be employed for the structure that periodically obtains the Baseline capacitance values for coping with the environmental change such as temperature. It is preferable to store the coefficient α in the nonvolatile memory as it is determined in accordance with the structure of the display panel PNL. However, both the Baseline capacitance value and the coefficient α may be stored in the nonvolatile memory or in the volatile memory.

The signal processing unit SPB receives digital signals from the analog-digital converter ADCU, and reads required data from the control data table containing the Baseline capacitance values and the coefficients α through access to the memory unit MEM so as to execute difference calculation of the capacitance value required for the touch detection, noise removing calculation, and coordinate calculation. The difference calculation is executed by the differential arithmetic circuit Diff, and the noise removing calculation for removing noise is executed by the noise filtering circuit NF. The coordinate arithmetic unit CoorC receives the touch detection calculation result from the differential arithmetic circuit Diff and the noise filtering circuit NF, executes the coordinate calculation of the touch position in the active region AA, and sends the results to the host processor (Host).

Figure 28:
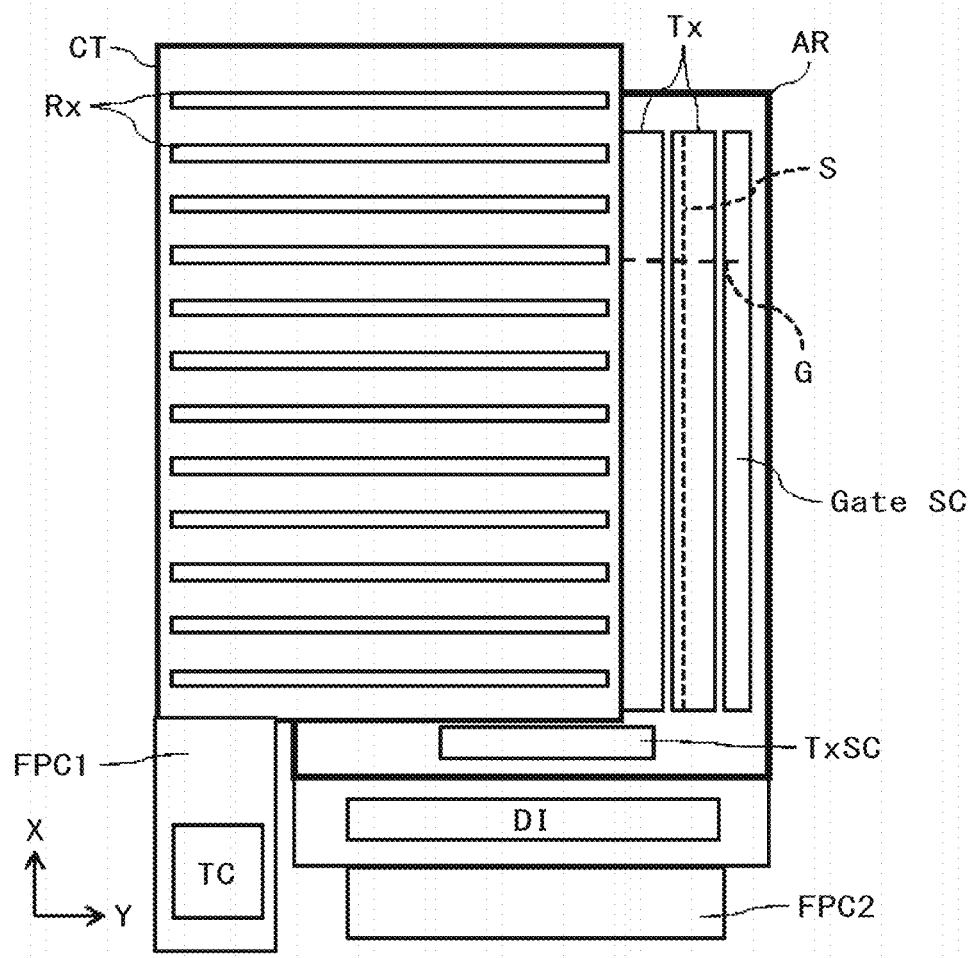
FIG. 28 is a plan view schematically showing a structure of the common electrodes and the detection electrodes of the sensor provided for the display device DSP with sensor according to the embodiment.

FIG. 28 is a plan view schematically showing a structure of the drive electrodes and the detection electrodes of the sensor provided for the display device DSP with sensor according to the embodiment. This structure is shown in FIGS. 5, 7, 15, 17, 20, 22, and 25.

FIG. 28 shows the relationship between the drive electrodes (Come1, Come2, Come3, . . . ) on the array substrate AR (SUB1) and the detection electrodes Rx on the counter substrate CT (SUB2). During display, the voltage adapted to display drive is supplied to the common electrode (Come1, Come2, Come3 . . . ) for display, and during touch detection, the drive pulse for touch detection is supplied to the common electrodes as the drive electrodes Tx driven upon touching.

The drive electrodes Tx in the stripe arrangement are disposed on the array substrate AR while extending in the X direction. The pixel source line (signal line) S is disposed to extend in the X direction, and the pixel gate line (Scanning line) G is disposed to extend in the Y direction.

A gate scanning circuit GateSC (gate driver GD: GD-L, GD-R) for scanning the pixel gate line (scanning line) G is disposed between the right side of the array substrate AR and the drive electrode Tx. The Tx line scanning circuit TxSC (common electrode drive circuit CD) for scanning the drive electrodes Tx is disposed at the side to which the FPC (Flexible Print Circuit)2 at the side of the array substrate AR is connected (source line S extending direction). The Tx line scanning circuit TxSC is connected to the touch controller TC disposed on the flexible circuit board FPC1. The display controller DI is disposed on the side of the flexible circuit board FPC2 from the Tx line scanning circuit TxSC.

The detection electrodes Rx in the stripe arrangement are disposed parallel to one another while extending in the Y direction. The detection electrodes Rx in the stripe arrangement are disposed parallel to the pixel gate line (scanning line) G. The detection electrodes Rx are connected to the touch controller TC via the lead-out wiring (not shown). The FPC1 and FPC2 are connected to the host processor. Referring to FIG. 28, the drive electrodes Tx are arranged parallel to the source line S. It is therefore possible to extract the wiring from the drive electrode Tx toward the direction at the FPC2 side (source line S extending direction). Therefore, the peripheral (frame) regions at the left and right sides of the array substrate AR may be reduced.

Figure 29:
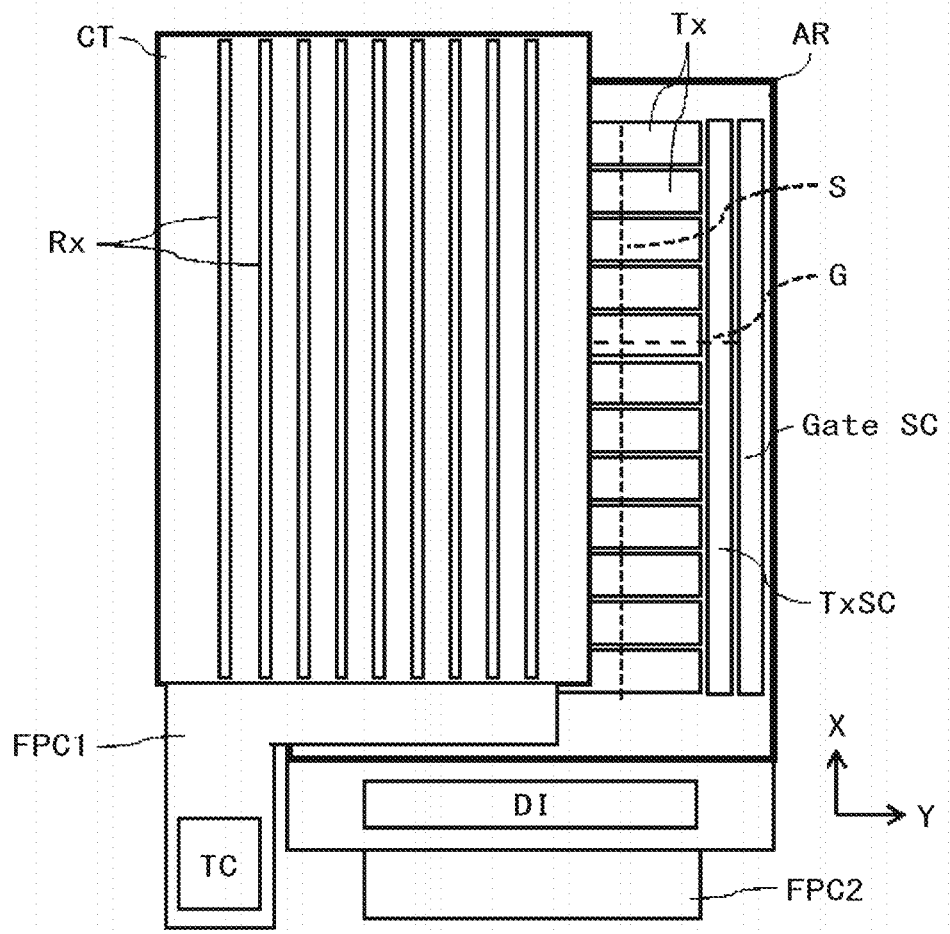
FIG. 29 is a plan view schematically showing another structure of the sensor including the common electrodes and the detection electrodes, provided for the display device DSP with sensor according to the embodiment.

FIG. 29 is a plan view schematically showing another structure of the drive electrodes and the detection electrodes of the sensor provided for the display device DSP with sensor according to the embodiment. The illustrated structure relates to the one as shown in FIG. 19.

Likewise FIG. 28, FIG. 29 shows the relationship between the drive electrodes Tx on the array substrate AR (SUB1) and the detection electrodes Rx on the counter substrate CT (SUB2). Referring to FIG. 29, the respective directions of the drive electrodes Tx, and the detection electrodes Rx both in the stripe arrangement are different from those as shown in FIG. 28.

The drive electrodes Tx in the stripe arrangement are disposed parallel on the array substrate AR while extending in the Y direction. The pixel source line (signal line) S is disposed parallel to extend in the X direction, and the pixel gate line (scanning line) G is disposed parallel to extend in the Y direction.

The gate scanning circuit GateSC (gate driver GD: GD-L, GD-R) for scanning the pixel gate line (scanning line) G, and the Tx line scanning circuit TxSC (common electrode drive circuit CD) for scanning the drive electrodes Tx are disposed between the right side of the array substrate AR and the drive electrodes Tx. The display controller DI is disposed on the side of the drive electrode from the FPC2 at the side of the array substrate AR.

Meanwhile, the detection electrodes Rx in the stripe arrangement are disposed on the counter substrate CT parallel to one another while extending in the X direction. That is, the detection electrodes Rx in the stripe arrangement are disposed parallel to the pixel source line (signal line) S. The detection electrodes Rx are connected to the touch controller TC via the lead-out wirings (not shown). The FPC1 and the FPC2 are associated with the host processor or the like.

It is to be understood that the above-described display device according to the embodiment may be arbitrarily designed and modified by those who skilled in the art so long as it is within the scope of the present invention.

As understood by those who skilled in the art, the present invention may be varied or modified into arbitrary forms within the scope of the present invention. For example, it is possible to add and remove any component or change the design thereof, or add and remove any process step or change its condition in the nonrestrictive manner so long as they are within the scope of the present invention.

The present invention provides the advantageous effects besides those derived from the above-described embodiments as understood by those who skilled in the art.

The present invention may be implemented by arbitrarily combining a plurality of components as disclosed above. For example, some components may be removed from all the disclosed components. Alternatively, the components selected from the different embodiments may also be arbitrarily combined.

What is claimed is:

1. A display device comprising:
    a detection circuit;
    a touch detection region including a plurality of detection electrodes;
    a peripheral region around the touch detection region;
    a plurality of wirings arranged in the peripheral region, and connected between the detection electrodes and the detection circuit; and
    an auxiliary wiring extending parallel to the wirings, and connected to the detection circuit,
    wherein the detection circuit detects capacitance values of each of the detection electrodes to obtain first detection values,
    wherein the detection circuit includes a table having predetermined coefficients each of which corresponds to each of the detection electrodes, at least two coefficients have different value from each other,
    wherein the detection circuit detects a capacitance value of the auxiliary wiring and multiply the predetermined coefficients corresponding to each of the detection electrodes to the auxiliary wiring to obtain second detection values,
    wherein the detection circuit subtracts corresponding second detection value from each of the first detection values to obtain third detection values, and determines that the external proximity object has been brought into a proximity state if at least one of the third detection values is larger than a predetermined value.

2. The display device according to claim 1, wherein the auxiliary wiring is disposed outside an outermost wiring of the wirings.

3. The display device according to claim 1, wherein the auxiliary wiring is disposed between the wirings, respectively.

4. The display device according to claim 1, wherein a touch detection coordinate is obtained in reference to detection information detected in the touch detection region and information detected through the auxiliary wiring.

5. The display device according to claim 1, wherein:
    a determination is made whether an object exists around the peripheral region; and
    a subsequent processing is changed in the presence of the object.

6. The display device according to claim 1, wherein the detection electrodes are disposed in a stripe arrangement parallel to a pixel signal line.

7. The display device according to claim 1, wherein the detection electrodes are disposed in a stripe arrangement parallel to a pixel scanning line.

8. The display device according to claim 1, wherein:
    the detection electrode is divided into a plurality of electrodes arranged in a matrix in a first direction and a second direction; and
    the divided electrodes are connected to the detection circuit via the wirings, passing through the peripheral region.

9. The display device according to claim 1, wherein the detection electrode extends to reach the peripheral region.

10. A display device comprising:
    a display panel including a plurality of display elements;
    a plurality of detection electrodes each with a capacitance for detecting an external proximity object around a detection region;
    a plurality of wirings laid out along at least one side of the display panel, the wirings being connected to the detection electrodes, respectively;
    an auxiliary wiring disposed parallel to the wirings;
    a control circuit electrically coupled to the wirings and the auxiliary wiring for detecting each capacitance of the detection electrodes and the auxiliary wiring;
    a plurality of drive electrodes disposed in a direction intersecting the detection electrodes; and
    a drive circuit for driving the drive electrodes,
    wherein the control circuit includes a table having predetermined coefficients each of which corresponds to each of intersections between the plurality of detection electrodes and the plurality of driving electrodes, at least two coefficients have different value from each other,
    wherein in response to voltage changes of the drive electrodes, the control circuit detects capacitance values of each of the intersections to obtain first detection values, wherein the control circuit detects capacitance value of the auxiliary wiring and multiply predetermined coefficients corresponding to each of the intersections to the auxiliary wiring to obtain second detection values, wherein the control circuit subtracts the second detection values from the first detection values to obtain third detection values, and determines that the external proximity object has been brought into a proximity state if at least one of the third detection value is larger than a predetermined value.

11. The display device according to claim 10, wherein the control circuit sequentially drives the drive electrodes, and determines a coordinate at which the external proximity object is in proximity to the detection electrode having the detected third detection value larger than the predetermined value.

12. A display device comprising:
a display panel including a plurality of display elements;
a plurality of detection electrodes each with a capacitance for detecting an external proximity object around a detection region;
a plurality of wirings laid out along at least one side of the display panel, the wirings being connected to the detection electrodes, respectively;
an auxiliary wiring disposed parallel to the wirings; and
a control circuit electrically coupled to the wirings and the auxiliary wiring, wherein the detection circuit includes a table having predetermined coefficients each of which corresponds to each of the detection electrodes, at least two coefficients have different value from each other, wherein the control circuit detects capacitance values of each of the detection electrodes to obtain first detection values, wherein the control circuit detects a capacitance value of the auxiliary wiring and multiply the predetermined coefficients corresponding to each of the detection electrodes to the auxiliary wiring to obtain second detection values, wherein the control circuit subtracts the second detection values from the first detection values to obtain third detection values, and determines that the external proximity object has been brought into a proximity state if at least one of the third detection values is larger than a predetermined value.

* * * * *